US010065671B2

(12) United States Patent
Sugishita

(10) Patent No.: US 10,065,671 B2
(45) Date of Patent: Sep. 4, 2018

(54) TELESCOPIC STEERING COLUMN AND STEERING DEVICE

(71) Applicant: NSK LTD., Tokyo (JP)

(72) Inventor: Suguru Sugishita, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/551,428

(22) PCT Filed: May 18, 2016

(86) PCT No.: PCT/JP2016/064787
§ 371 (c)(1),
(2) Date: Aug. 16, 2017

(87) PCT Pub. No.: WO2017/068804
PCT Pub. Date: Apr. 27, 2017

(65) Prior Publication Data
US 2018/0029628 A1 Feb. 1, 2018

(30) Foreign Application Priority Data

Oct. 21, 2015 (JP) ................................. 2015-207040

(51) Int. Cl.
*B62D 1/185* (2006.01)
(52) U.S. Cl.
CPC .................... *B62D 1/185* (2013.01)
(58) Field of Classification Search
CPC ......... B62D 1/184; B62D 1/185; B62D 1/187
See application file for complete search history.

(56) References Cited

U.S. PATENT DOCUMENTS

| 5,235,734 | A | 8/1993 | DuRocher et al. | |
| 7,699,344 | B2* | 4/2010 | Moriyama | B62D 1/184 280/775 |
| 8,037,782 | B2* | 10/2011 | Uesaka | B62D 1/184 74/493 |
| 8,550,497 | B2* | 10/2013 | Takezawa | B62D 1/185 280/775 |

(Continued)

FOREIGN PATENT DOCUMENTS

| CN | 102112362 A | 6/2011 |
| CN | 102791559 A | 11/2012 |

(Continued)

OTHER PUBLICATIONS

International Search Report for PCT/JP2016/064787 dated Aug. 9, 2016 [PCT/ISA/210].

(Continued)

*Primary Examiner* — Laura Freedman
(74) *Attorney, Agent, or Firm* — Sughrue Mion, PLLC

(57) ABSTRACT

A steering column (4a) is configured such that a rear section of an inner column (10a) disposed on a front side of the steering column and a front section of an outer column (11a) disposed on a rear side of the steering column are displaceably set with respect to each other in an axial direction so that a total length of the steering column can be extended and contracted. A roller (70) is rotatably supported on a lower portion of a front end section of the outer column (11a) by a shoulder bolt (56) disposed in a width direction. An outer circumferential surface of the roller (70) is in contact with a lower surface of the inner column (10a).

10 Claims, 22 Drawing Sheets

(56) References Cited

U.S. PATENT DOCUMENTS

| | | | |
|---|---|---|---|
| 8,555,745 B2 | 10/2013 | Inoue | |
| 8,601,901 B2 * | 12/2013 | Ishii | B62D 1/184 |
| | | | 280/775 |
| 8,651,526 B2 * | 2/2014 | Nakamura | B62D 1/195 |
| | | | 280/775 |
| 8,746,740 B2 * | 6/2014 | Tanaka | B62D 1/184 |
| | | | 280/771 |
| 8,757,664 B2 | 6/2014 | Moriyama et al. | |
| 8,943,923 B2 * | 2/2015 | Kakishita | B62D 1/187 |
| | | | 280/775 |
| 9,073,573 B2 * | 7/2015 | Sugiura | B62D 1/184 |
| 9,365,234 B2 | 6/2016 | Moriyama | |
| 9,381,935 B2 * | 7/2016 | Ishimura | B60R 25/02 |
| 9,707,910 B2 * | 7/2017 | Kakita | B62D 1/19 |
| 2003/0227163 A1 | 12/2003 | Murakami et al. | |
| 2009/0256342 A1 | 10/2009 | Cymbal et al. | |
| 2011/0185839 A1 | 8/2011 | Inoue | |
| 2011/0265599 A1 | 11/2011 | Owens | |
| 2012/0318092 A1 * | 12/2012 | Kuroumaru | B62D 1/195 |
| | | | 74/492 |
| 2013/0160595 A1 | 6/2013 | Moriyama et al. | |
| 2015/0135882 A1 | 5/2015 | Rauber et al. | |
| 2015/0151776 A1 | 6/2015 | Moriyama | |

FOREIGN PATENT DOCUMENTS

| | | | |
|---|---|---|---|
| CN | 103874619 A | | 6/2014 |
| EP | 2 735 494 A2 | | 5/2014 |
| JP | 05262238 A | * | 10/1993 |
| JP | 3783524 B2 | | 6/2006 |
| JP | 2007-45276 A | | 2/2007 |
| JP | 2008-126750 A | | 6/2008 |
| JP | 2009-29152 A | | 2/2009 |
| JP | 2010-116047 A | | 5/2010 |
| JP | 2011-6056 A | | 1/2011 |
| JP | 5266780 B2 | | 8/2013 |
| JP | 2014088124 A | | 5/2014 |
| JP | 2014-104871 A | | 6/2014 |
| JP | 2017001622 A | * | 1/2017 |

OTHER PUBLICATIONS

Communication dated May 15, 2018 issued by the European Patent Office in counterpart application No. 16857122.2.
Communication dated May 11, 2018 from the State Intellectual Property Office of the P.R.C. in counterpart China application No. 201680029579.1.

* cited by examiner

TELESCOPIC STEERING COLUMN AND STEERING DEVICE

CROSS REFERENCE TO RELATED APPLICATIONS

This application is a National Stage of International Application No. PCT/JP2016/064787, filed May 18, 2016, claiming priorities based on Japanese Patent Application Nos. 2015-207040, filed Oct. 21, 2015, the contents of all of which are incorporated herein by reference in their entirety.

TECHNICAL FIELD

The present invention relates to a telescopic steering column constituting a steering device which enables adjustment of a front and rear position of a steering wheel in accordance with a physique and a driving posture of a driver.

TECHNICAL BACKGROUND

A steering device configured to give a steering angle to a steering wheel is configured to transmit movement of a steering wheel 1 to a steering gear unit via a steering shaft 2 and give a steering angle to right and left steering wheels 3 as shown in FIG. 21. The steering gear unit is configured to displace (push and pull) a tie rod 6 on the basis of rotation of the steering shaft 2. As such a steering device, a telescopic type steering device which enables adjustment of a front and rear position of the steering wheel 1 in accordance with a physique and a driving posture of a driver is conventionally known.

RELATED ART DOCUMENTS

Patent Document

Patent Document 1:
  Japanese Patent Application, Publication No. 2014-104871

SUMMARY OF INVENTION

Technical Problem

An objective of an aspect of the present invention is to provide a telescopic steering device by which a stable operational feeling for front and rear position adjustment is obtained.

Solution to Problem

A telescopic steering column according to an aspect of the present invention includes an inner column and an outer column. A rear section of an inner column disposed on a front side of the telescopic steering column and a front section of an outer column disposed on a rear side of the telescopic steering column are displaceably set with each other in an axial direction so that a total length of the telescopic steering column is able to be extended and contracted. Particularly, in the telescopic steering column, a pressing member is provided on a lower portion of the front section (for example, the lower end section) of the outer column so as to be in contact with a lower surface of the inner column (in a state in which central axes of the inner column and the outer column coincide with each other) to prevent the rear end section of the outer column from tilting downward (the front end section of the outer column from tilting upward on the basis of such a gap) on the basis of a gap between an inner circumferential surface of the outer column and an outer circumferential surface of the inner column.

A steering device according to another aspect of the present invention includes a steering shaft, a steering column, a support bracket, and an adjusting rod. The steering shaft is configured such that a rear section of an inner shaft disposed on a front side of the steering shaft and a front section of an outer shaft disposed on a rear side of the steering shaft are displaceably set with each other in an axial direction while torque can be transmitted. The steering column rotatably supports the steering shaft therein by using, for example, a plurality of rolling bearings. Since the support bracket is installable on a vehicle body, a pair of support plates configured to sandwich the front end section of the outer column constituting the steering column from both sides thereof in the width direction are provided. The adjusting rod is inserted through a telescopic adjustment slot, which is formed in the front end section of the outer column in an axial direction of the outer column, and through holes, which are formed in the support plates (when the tilt mechanism is provided, the through holes are set to be the tilt adjustment slotted holes/elongated holes which are vertically elongated, and when the tilt mechanism is not provided, the through holes are set to be simple circular holes) in the width direction. Particularly, in the steering device, the telescopic steering column of the present invention is used as the steering column.

A steering device according to another aspect of the present invention includes an outer column having a cylindrical body; an inner column which is enclosed by the cylindrical body at at least one end portion of the cylindrical body, and in which a relative axial position of the outer column with respect to the inner column is adjustable; and a mechanism provided in the outer column, having a roller disposed near the end portion of the cylindrical body, and arranged to be in contact with the inner column. In an example, the mechanism can have an elastic structure in a radial direction of the cylindrical body.

Advantageous Effects of Invention

According to an aspect of the present invention, a telescopic steering device by which a high operational feeling for front and rear position adjustment is obtained.

DESCRIPTION OF EMBODIMENTS

First Example of Embodiment

A first example according to an embodiment of the present invention will be described with reference to FIGS. 1 to 16. A steering device in this example includes a steering wheel 1, a steering shaft 2a, a steering column 4a, a tightening mechanism 101, a steering force auxiliary device (an assist device and an electric power type power steering device) 5a, and a steering gear unit 7. Note that, in this specification and the claims, a forward and rearward direction, a width direction (a leftward and rightward direction), and a vertical direction refer to directions associated with a vehicle (a vehicle body) in which the steering column 4a is assembled unless otherwise defined. Furthermore, an "axial direction" refers to an axial direction of the steering shaft 2a or an axial direction of an outer column 11a unless otherwise defined.

Figure 21:
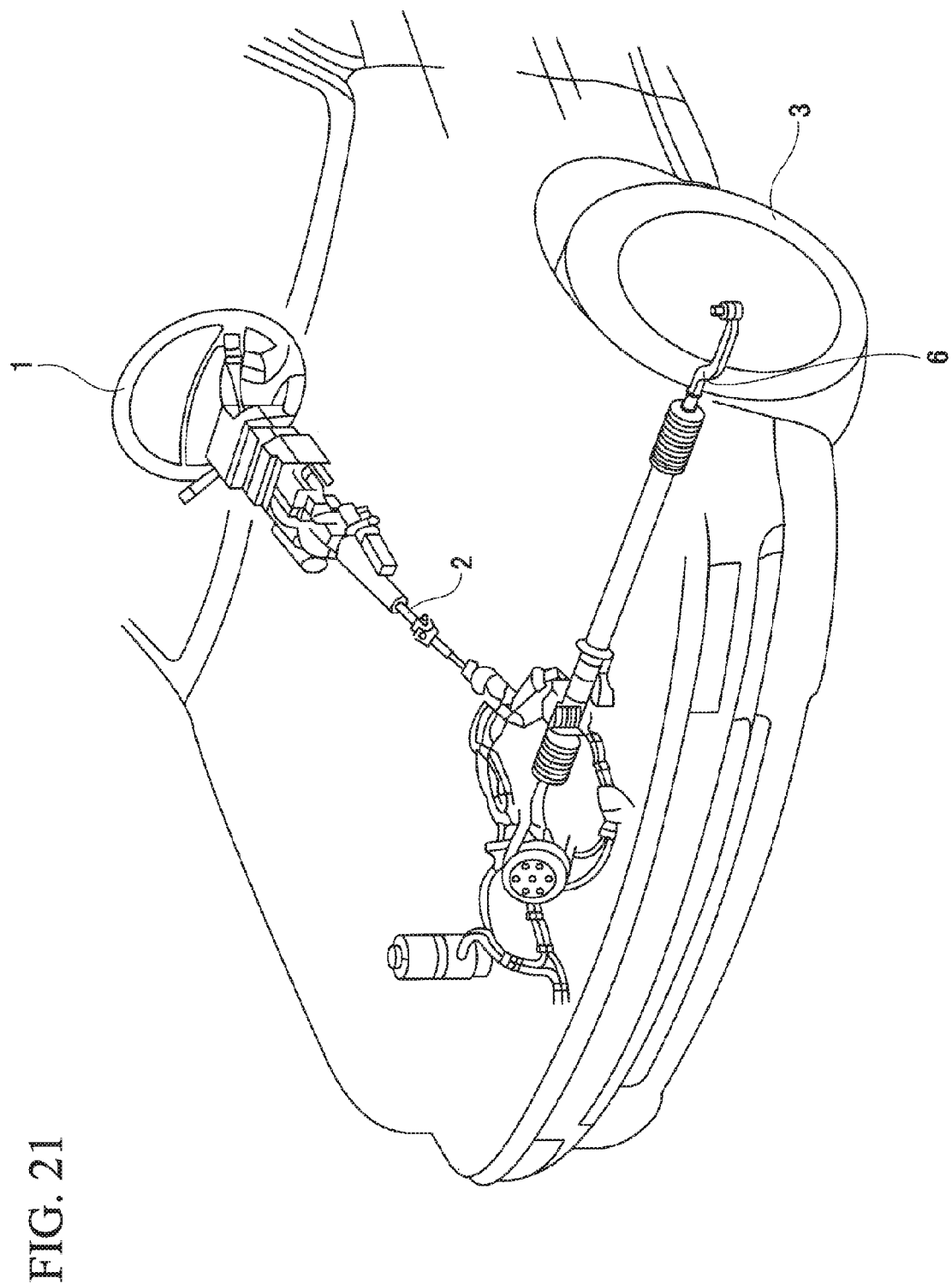
FIG. 21 is a schematic perspective view illustrating an example of a steering device mounted in a vehicle.

The steering shaft 2a includes an inner shaft 8a disposed relatively forward and an outer shaft 9a disposed relatively rearward. The steering column 4a is supported on a vehicle body 15a. For example, the steering column 4a has a cylindrical shape. Alternatively, the steering column 4a can have a shape other than the cylindrical shape. The steering column 4a includes at least a part of the steering shaft 2a. The steering shaft 2a is inserted through the steering column 4a. The steering shaft 2a is rotatably supported on an inner diameter side of the steering column 4a via a plurality of rolling bearings (not shown). A part of the steering shaft 2a is arranged to protrude closer to a rear side than a rear end opening of the steering column 4a. The steering wheel 1 (refer to FIGS. 21 and 22) is fixed to a rear end section of the steering shaft 2a.

An electric motor 32a (the assist device 5a) serving as a power source configured to exert an assisting force is disposed near a front end section of the steering column 4a. The electric motor 32a is supported on a gear housing 12a fixed to the front end section of the steering column 4a. A part of the inner shaft 8a is inserted into the gear housing 12a. A front end section of the inner shaft 8a is coupled to a predetermined shaft in the steering force auxiliary device 5a. For example, a shaft joined to the predetermined shaft via a torsion bar or the like in the steering force auxiliary device 5a protrudes from a front end surface of a gear housing 12. Output torque (the assisting force) of the electric motor 32a is exerted on the steering shaft 2a through a speed reducer provided in the gear housing 12a. The gear housing 12a is supported by and fixed to the vehicle body 15a through a lower bracket 14a.

In this example, the steering device includes both a tilt mechanism (an example of a position adjusting mechanism) configured to adjust a vertical position of the steering wheel 1 in accordance with a physique and a driving posture of a driver and a telescopic mechanism (an example of the position adjusting mechanism) configured to adjust a front and rear position of the steering wheel 1. Alternatively, the steering device can include the telescopic mechanism without including the tilt mechanism.

With regard to the telescopic mechanism, the inner shaft 8a and an outer shaft 9a are set to be able to transmit a turning force and to be displaceable with respect to one another in the axial direction. For example, the steering shaft 2a has a spline engagement structure. The inner shaft 8a and the outer shaft 9a are displaced (the steering shaft 2a is extended and contracted) in the axial direction so that a front and rear position of the steering wheel 1 can be adjusted. Furthermore, a total length of the steering shaft 2a can be reduced due to the above-described relative displacement even when a strong impact is received. The steering column 4a includes an inner column 10a disposed relatively forward and an outer column 11a disposed relatively rearward. The inner column 10a is partially inserted into the outer column 11a and is arranged to be movable relative to the outer column 11a in the axial direction. The inner column 10a is partially enclosed by the outer column 11a. A relative position of the inner column 10a and the outer column 11a in the axial direction (an insertion length of the inner column 10a with respect to the outer column 11a) varies so that the total length of the steering column 4a varies. In other words, a front end section of the outer column 11a, which is disposed at a relatively rear side of the steering column 4a, is loosely set with respect to a rear end section of the inner column 10a, which is disposed at a relatively front side of the steering column 4a, so that a relative displacement therebetween can be applied in the axial direction and so that the total length of the steering column 4a can be extended and contracted. The steering column 4a is installable on the vehicle body 15a with an upper bracket (a support bracket) 17a. The outer column 11a is supported with respect to the upper bracket 17a to be able to be moved in the forward and rearward direction. The support bracket 17a is supported on the vehicle body 15a through a locking capsule 18a to be able to be detached (drop out) when receiving a strong impact.

With regard to the tilt mechanism, one end of the inner column 10a is supported on the vehicle body 15a by the lower bracket 14a through the gear housing 12a. The lower bracket 14a supports the gear housing 12a to be able to freely rock about a tilt shaft 16a disposed in the width direction (to be substantially parallel to the width direction). The steering column 4a is supported in the vehicle body 15a in a manner displaceable by rocking using the tilt shaft 16a installed in the width direction as a center. The outer column 11a is supported on the upper bracket 17a to be movable in the vertical direction.

In this example, the outer column 11a is made of a light alloy, such as an aluminum-based alloy and a magnesium-based alloy, and is configured such that the frame body (the main body and the sandwiched portion main body) 34 disposed at a first half thereof and the cylindrical body (a cylindrical part) 35 disposed at a second half thereof are arranged in the axial direction and integrally coupled to each other. Alternatively, the outer column 11a can be configured such that the frame body (the main body and the sandwiched portion main body) 34 made of a light alloy such as an aluminum-based alloy and a magnesium-based alloy and the cylindrical body (the cylindrical member) 35 made of an iron-based alloy such as a carbon steel plate in the axial direction. Alternatively and/or additionally, the outer column 11a can have other materials and/or other constitutions. The frame body 34 is movably supported on the upper bracket 17a in the forward and rearward direction and the vertical direction. An axial slit (a first slit) 36 extending in the axial direction is formed in a lower surface of the frame body 34. A front end section of the axial slit 36 is open in a front end surface of the frame body 34. In addition, circumferential slits 37a and 37b extending in a circumferential direction are formed in a portion near a front end of the frame body 34 and a portion near a rear end thereof in a lower half thereof. The circumferential slit 37a at a front side of the frame body 34 is formed to intersect a portion near a front end of the axial slit 36 in the circumferential direction. The circumferential slit 37b at a rear side of the frame body 34 is formed to intersect a portion near a rear end of the axial slit 36 in the circumferential direction. Clamp parts 38 and 38 are formed to enclose both sides of the frame body 34 in the width direction using the axial slit 36, the circumferential slit 37a, and the circumferential slit 37b in three directions.

In the clamp parts 38 and 38, three sides are open to be continuous with the axial slit 36 and the circumferential slits 37a and 37b, and the remaining one side is joined to the frame body 34. That is to say, with respect to the clamp part 38, a non-fixed end is continuously formed at least on two lateral sides, which are arranged to be spaced to be apart from each other in the axial direction, and on one side in a first direction intersecting the axial direction (a first intersecting direction; a substantially vertical direction in this example). Furthermore, the other side of the clamp part 38 in the first direction is a fixed end. In other words, the clamp part 38 has a cantilever structure with the fixed end extending in the axial direction. The clamp part 38 is lower in rigidity in at least the width direction than other portions of the frame body 34, and is elastically deformable in the width direction (an inner diameter thereof is elastically expandable and contractable). For example, each of the clamp parts 38 and 38 has an inner circumferential surface with a partial cylindrical surface shape. The clamp parts 38 and 38 are provided adjacent to both sides of the axial slit 36 in the circumferential direction. The clamp parts 38 and 38 have a shape in which the clamp parts extend in the axial direction and the circumferential direction (or the first direction). Projecting plates (projecting parts) 39 and 39 are provided on lower end sections of the clamp parts 38 and 38 in the width direction in a state in which the projecting plates protrude outwardly in the width direction (a second direction). Acting surfaces (third surfaces, third acting surfaces, and pressed surfaces) 40 and 40 receiving a tightening force of the tightening mechanism 101 are formed on outer surfaces of the projecting plates 39 and 39 in the width direction (the second direction). For example, the acting surface 40 has a flat surface shape. Additionally and/or alternatively, the acting surface 40 can have a shape other than a flat shape. Moreover, reinforcing ribs 51 and 51 are provided between upper surfaces (lateral surfaces of walls) of the projecting plates 39 and 39 and upper end sections and intermediate portions with a cylindrical surface shape of the outer surfaces of the clamp parts 38 and 38 in the width direction. In each side, the plurality of (five in the illustrated drawing) reinforcing ribs 51 are provided to extend in the width direction and are arranged to be spaced apart from each other in the forward and rearward direction (the axial direction). Note that, in this example, the first direction intersects the width direction of the vehicle body and is orthogonal to the axial direction. Alternatively, the first direction can substantially correspond to the circumferential direction of the outer column 11a. Alternatively, the first direction can intersect the axial direction in a different direction from the direction orthogonal to the axial direction. A second direction is assumed to be a direction intersecting the axial direction and the first direction. A substantial tightening direction of the tightening mechanism 101 may coincide with the second direction. In this example, the second direction substantially coincides with the width direction of the vehicle body. Alternatively and/or additionally, the second direction can include directions other than the width direction of the vehicle body.

The outer column 11a includes a reinforcing bridge part (a reinforcing part, a reinforcing structure, and a reinforcing member) 41 bridged between both sides of the outer column 11a in the second direction (substantially in the width direction of the vehicle body in this example). The reinforcing bridge part 41 is provided to extend to be substantially continuous between both sides of the outer column 11a in the width direction (second direction), and to physically join both sides of the outer column 11a in the width direction (second direction). In this example, the reinforcing bridge part 41 is provided on a lower portion of the frame body 34 to cover the clamp parts 38 and 38 from below. The reinforcing bridge part 41 is integrally formed with the outer column 11a. The reinforcing bridge part 41 includes a reinforcing plate 42 and a pair of joining parts 43a and 43b. A shape of the reinforcing bridge part 41 viewed from the width direction is a substantially U shape (an angulated U shape). In this example, the reinforcing plate 42 includes a flat plate 44 disposed parallel to a central axis of the outer column 11a and a pair of downward extending parts 45 and 45 provided to extend downward from a lower surface of both end sections of the flat plate 44 in the width direction. The reinforcing plate 42 has a substantially U shape (an angulated U shape) in section. A cutout 46 passing in a vertical direction is formed in an intermediate portion of a front end section of the reinforcing plate 42 (the flat plate 44) in the width direction. A plurality of (three in the illustrated example) flat-plate-shaped reinforcing coupling plates 52 and 52 extending in the width direction are provided between a lower surface of an intermediate portion of the flat plate 44 in the width direction and inner surfaces of downward extending parts 45 and 45 in the width direction in a state in which the reinforcing coupling plates 52 and 52 are spaced apart in the forward and rearward direction.

In this example, a joining part 43a disposed at the relatively front side of the reinforcing bridge part 41 is provided to extend upward from both sides (both sides of the cutout 46) of a front end section of the reinforcing plate 42 in the width direction. The joining part 43a is a portion of a lower surface of a front end section of the frame body 34 which is adjacent to a front side of a circumferential slit 37a, and is coupled to both sides which surround the axial slit (a first slit) 36 in the circumferential direction. Moreover, a joining part 43b disposed at the relatively rear side of the reinforcing bridge part 41 is provided to extend upward from a rear end section of the reinforcing plate 42. The joining part 43b is coupled to a portion of a lower surface of a rear end section of the frame body 34 which is adjacent to a rear side of a rear end section of the axial slit 36. Alternatively and/or additionally, the reinforcing bridge part 41 can have a different constitution from the above.

In this example, the outer column 11a includes the above-described reinforcing bridge part 41 and thus has high twist rigidity. The gaps (the slits) 47 and 47 with a substantially U shape (an angulated U shape) when viewed from the width direction (the second direction) are formed between the reinforcing bridge part 41 and the clamp parts 38 and 38. The gaps 47 and 47 have at least the telescopic adjustment slots (axial slits, first slits, and first through holes) 21a and 21a extending in the axial direction (an axial direction of the outer column 11a and an axial direction of a steering shaft 2a) and circumferential slits (the second slits) 37a and 37b provided to be continuous with the slots 21a and 21a and extending in a direction to intersect the slots 21a and 21a. The clamp parts 38 and 38 are provided adjacent to the slots 21a and 21a. The slots 21a and 21a have long axes in the axial direction (the axial direction of the outer column 11a and the axial direction of the steering shaft 2a). The slots 21a and 21a form spaces which are present between distal end sections (lower end sections) of the clamp parts 38 and 38 and upper surfaces of the reinforcing plate 42 (the flat plate 44). An adjusting rod 24a is inserted through the slots 21a and 21a in the width direction (the second direction).

The outer column 11a has an acting surface (a first surface, a first acting surface, a first abutting surface, and a torque transmission surface) 49a and an acting surface (a second surface, a second acting surface, a second abutting surface, and a torque transmission surface) 49b which are provided on two lateral surfaces thereof in the width direction. The acting surface 49a and the acting surface 49b are arranged to be spaced apart from each other in a first direction (a first intersecting direction) serving as a direction which intersects the axial direction (the axial direction of the outer column 11a and the axial direction of the steering shaft 2a). Furthermore, the clamp part 38 (and the acting surface 40) is arranged between the acting surface 49a and the acting surface 49b in the first direction. In this example, the adjusting rod 24a is arranged between the acting surface 49a and the acting surface 49b in the first direction, and the acting surface 40 of the clamp part 38 is arranged between the acting surface 49a and the adjusting rod 24a in the first direction. Furthermore, the axial slit 36 (the slot 21a) is arranged between the acting surface 49a and the acting surface 49b in the first direction. In this example, torque (a force in a twist direction) acting on the outer column 11a may be transmitted to the inner surfaces of support plates 22a and 22a in the upper bracket 17a via the acting surface 49a and the acting surface 49b.

In this example, the acting surface 49a is arranged within a range of an external form of the inner column 10a in the first direction. The acting surface 49b is arranged outside of the range of the external form of the inner column 10a in the first direction. In addition, the acting surface 49b is arranged outside of a range of an external form of a cylindrical body 35 of the outer column 11a. Furthermore, in the first direction, the acting surface 49a is arranged relatively close to a central axis of the inner column 10a, and the acting surface 49b is arranged relatively away from the central axis of the inner column 10a. Ridge parts 50a and 50a are provided in a portion overlapping a central axis of the outer column 11a in the first direction (or the vertical direction) on both sides of the outer column 11a (the frame body 34) in the width direction to protrude outwardly in the width direction (the second direction). The ridge part 50a is provided to extend to the outer column 11a. The acting surfaces 49a and 49a are provided on distal ends (outer surfaces in the width direction) of the ridge part 50a. Ridge parts 50b and 50b are provided on lower end sections of outer surfaces of the downward extending parts 45 and 45 to protrude outwardly in the width direction (the second direction). The ridge part 50b is provided to extend in the axial direction of the outer column 11a. The acting surfaces 49b and 49b are provided on distal ends (outer surfaces in the width direction) of the ridge part 50b. In other words, both of the acting surfaces 49a and 49b have a shape extending in the axial direction of the outer column 11a and have longer lengths than that of the clamp part 38 in the axial direction. For example, the acting surface 49a and the acting surface 49b have a flat surface shape. Additionally and/or alternatively, the acting surface 49a and the acting surface 49b can have a shape other than the flat shape. The acting surfaces 49a and 49b have a higher rigidity in the width direction (the second direction) than those of the clamp parts 38 and 38. A plurality of (six in the illustrated example) depressed parts 53 and 53, which are depressed inwardly in the width direction, are provided in intermediate portions in the vertical direction (above the ridge part 50b) on the outer surfaces of the downward extending parts 45 and 45 in the width direction in a state in which the depressed parts 53 and 53 are spaced apart from each other in the forward and rearward direction.

Figure 12:
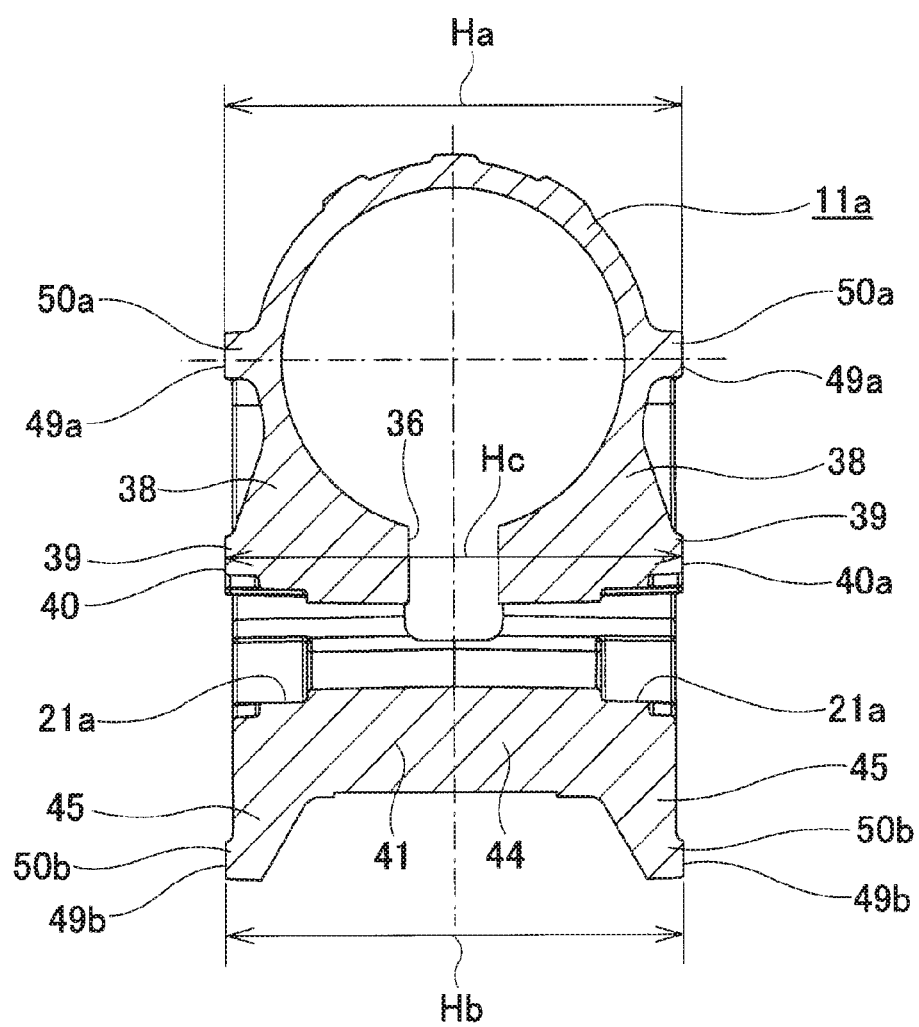
FIG. 12 is a cross-sectional view taken along line B-B of FIG. 7.
Figure 13:
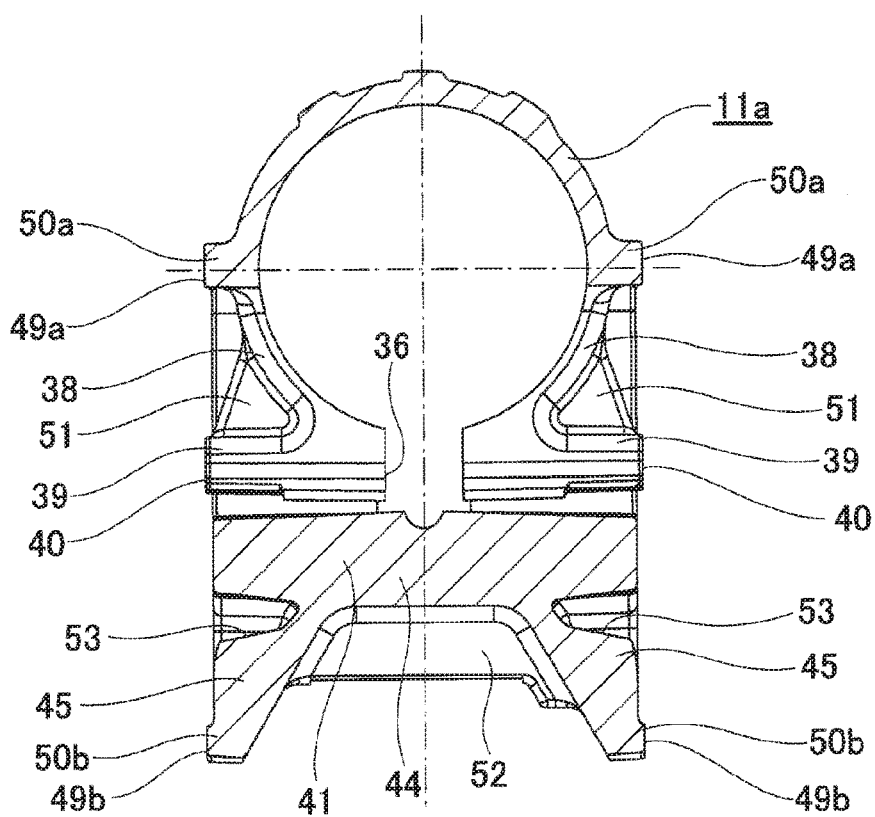
FIG. 13 is a cross-sectional view taken along line C-C of FIG. 7.
Figure 14:
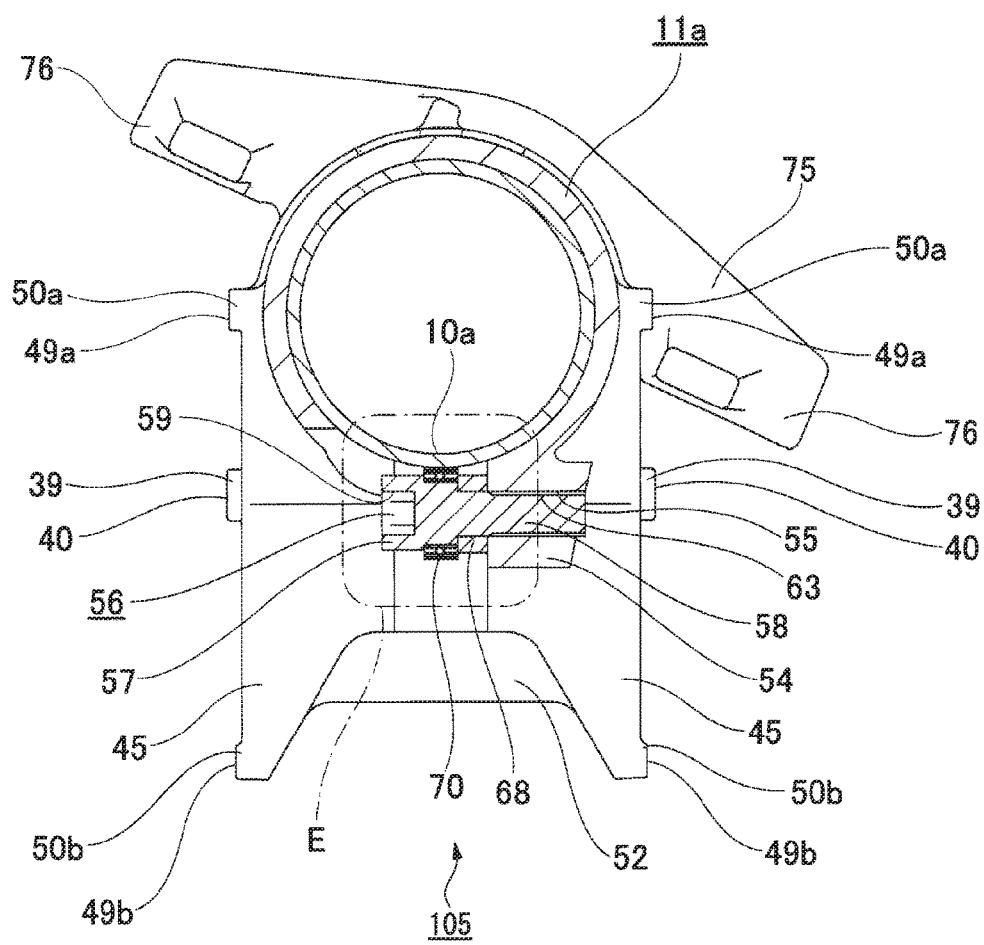
FIG. 14 is a cross-sectional view taken along line D-D of FIG. 7.
Figure 15:
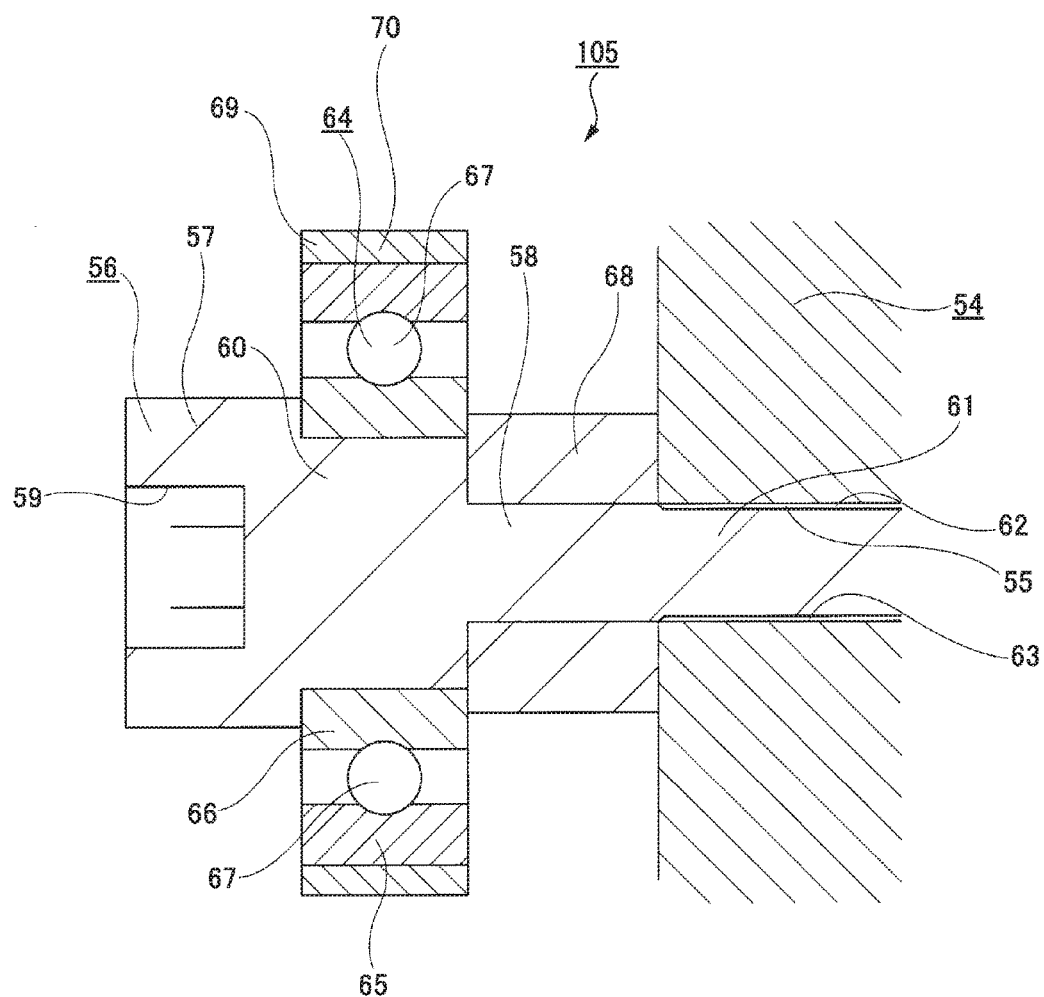
FIG. 15 is an enlarged diagram of portion E of FIG. 14.
Figure 16:
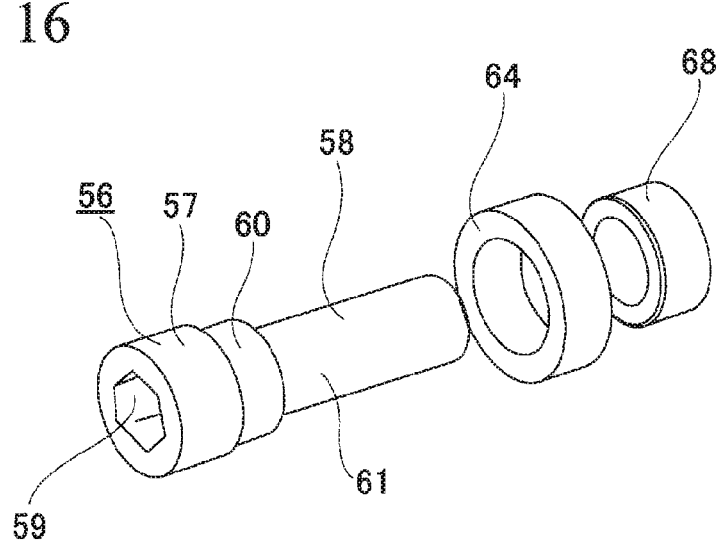
FIG. 16 is an exploded perspective view of a rolling bearing, a collar, and a bolt which constitute a pressing member and are taken out.

In this example, as shown in FIG. 12, in a state in which no external force is applied to the outer column 11a (tightening has been released (a second state)), a width dimension Ha of the pair of acting surfaces 49a and 49a provided on an upper side of the outer column 11a, a width dimension Hb of the pair of acting surfaces 49b and 49b provided on a lower side thereof, and a width dimension Hc of the acting surfaces 40 and 40 of the clamp parts 38 and 38 are substantially the same (Ha=Hb=Hc). In other words, the acting surface 49a, the acting surface 49b, and the acting surface 40 on one side of the outer column 11a in the width direction are located on the same virtual plane. Furthermore, the acting surface 49a, the acting surface 49b, and the acting surface 40 on the other side of the outer column 11a in the width direction are located on the same virtual plane. The acting surfaces 40 and 40 are arranged between the acting surfaces 49a and 49a and the acting surfaces 49b and 49b in the first direction. Alternatively, the acting surfaces 49a and 49a, the acting surfaces 49b and 49b, and the acting surfaces 40 and 40 can have a disposition relationship other than the above-described relationship. For example, when a clamping force of the clamp parts 38 and 38 needs to be increased and the like, the width dimension Hc can be increased in comparison to the width dimension Ha and the width dimension Hb (Hc>Ha=Hb).

Figure 7:
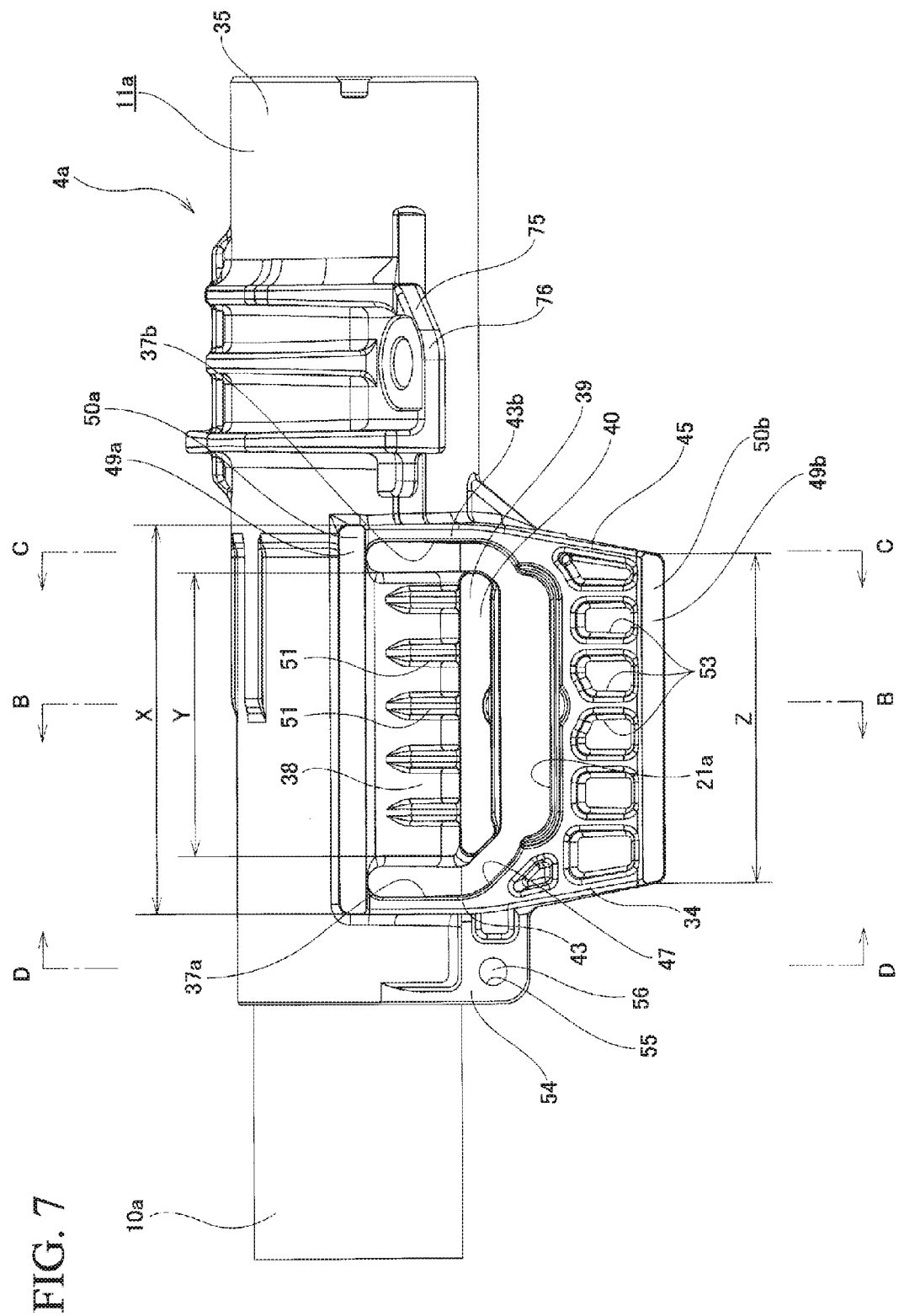
FIG. 7 is a side view of the outer column and the inner column which are taken out and viewed from one side in a width direction.
Figure 8:
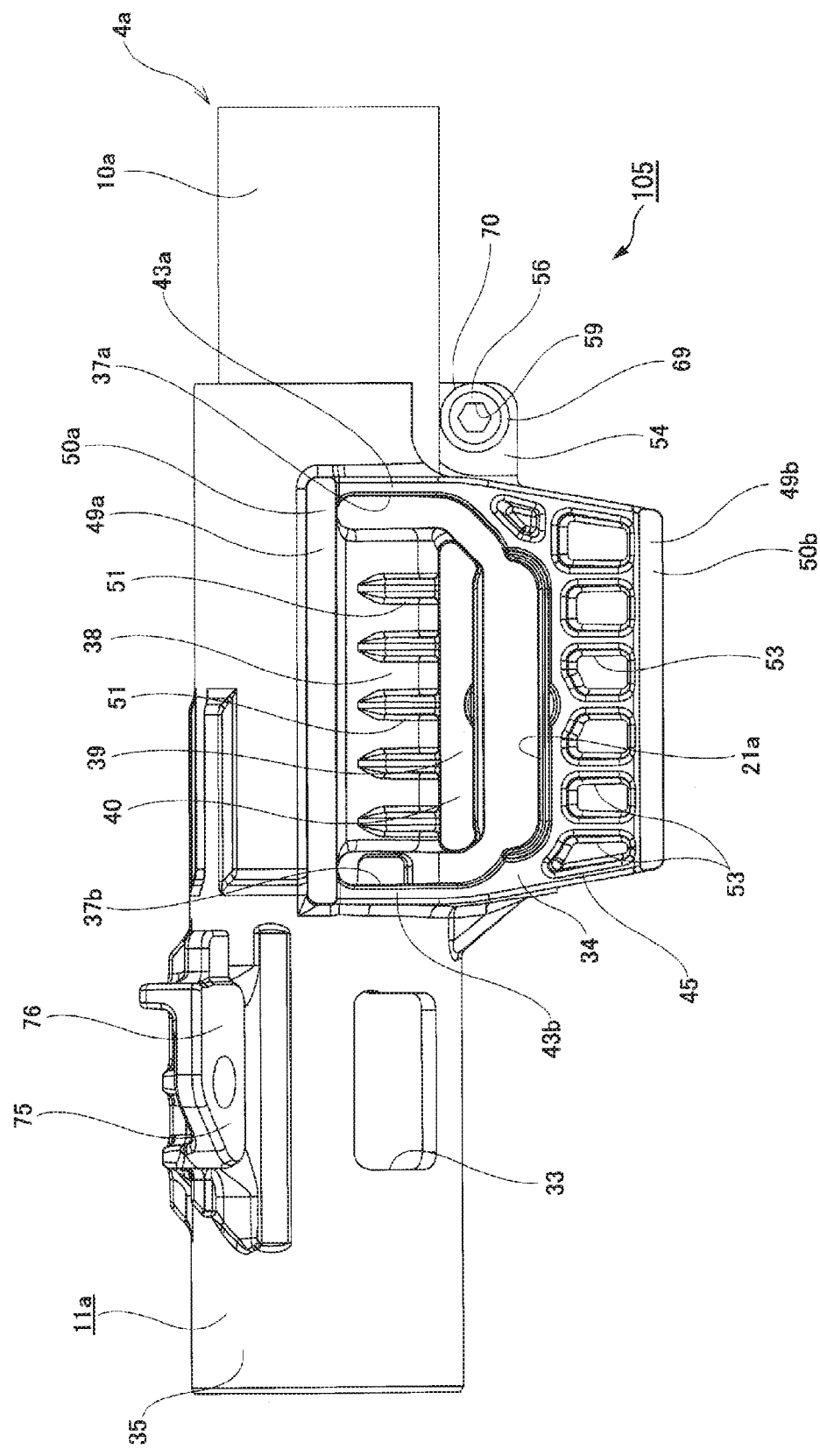
FIG. 8 is a side view of the outer column and the inner column which are taken out and viewed from the other side in the width direction.
Figure 9:
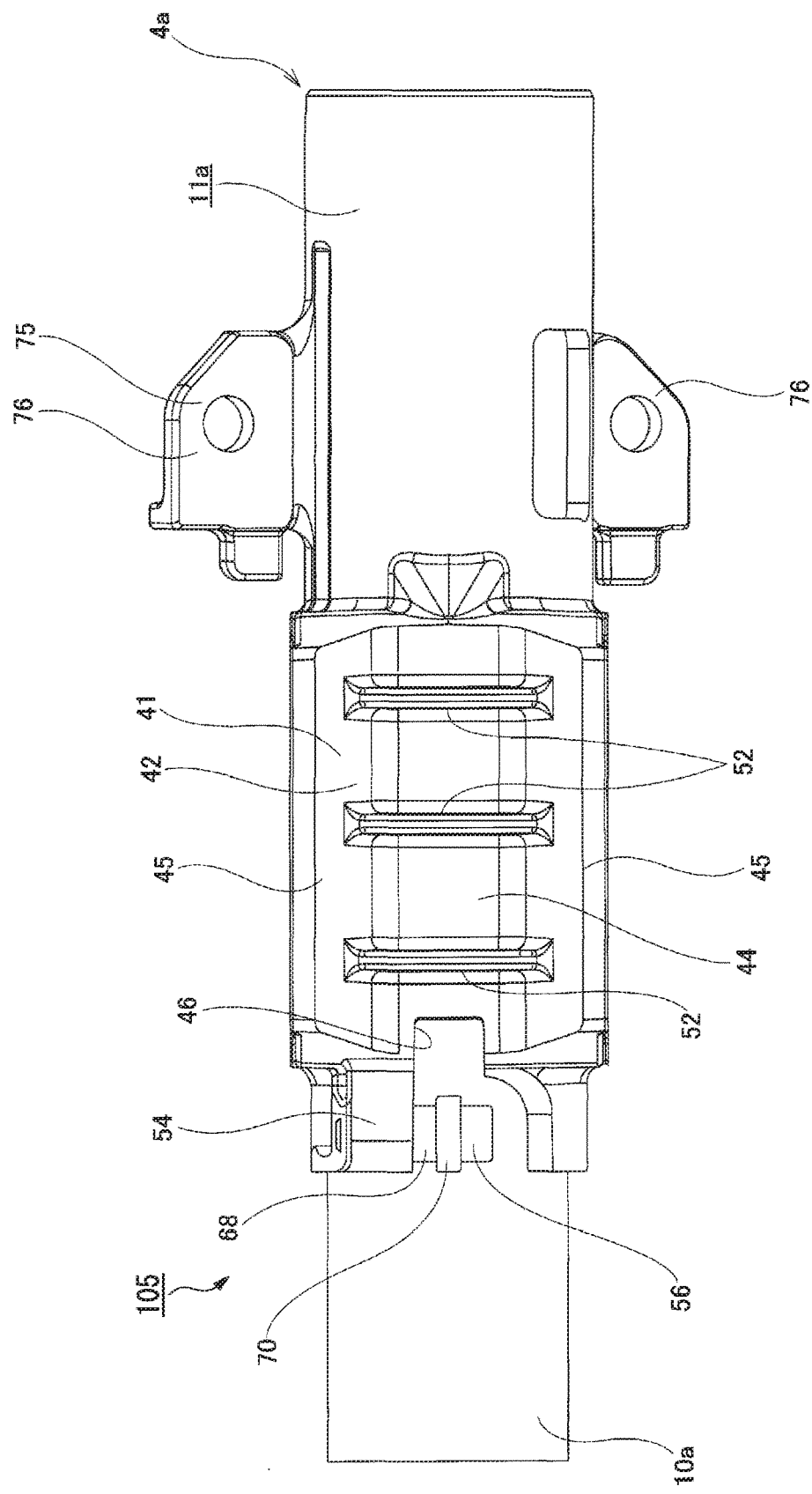
FIG. 9 is a bottom view of the outer column and the inner column of FIG. 7 viewed from below.
Figure 10:
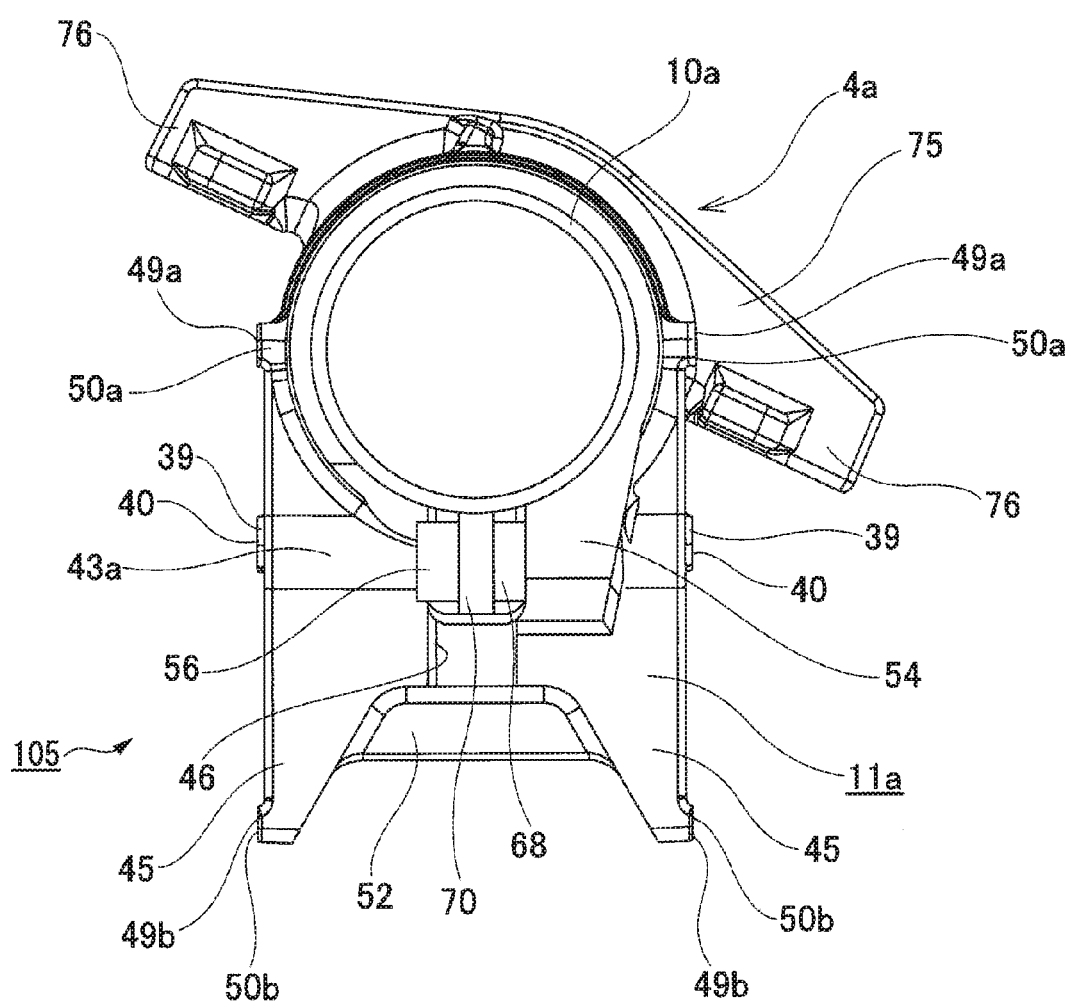
FIG. 10 is a front side end surface diagram of the outer column and the inner column of FIG. 7 viewed from the left side.
Figure 11:
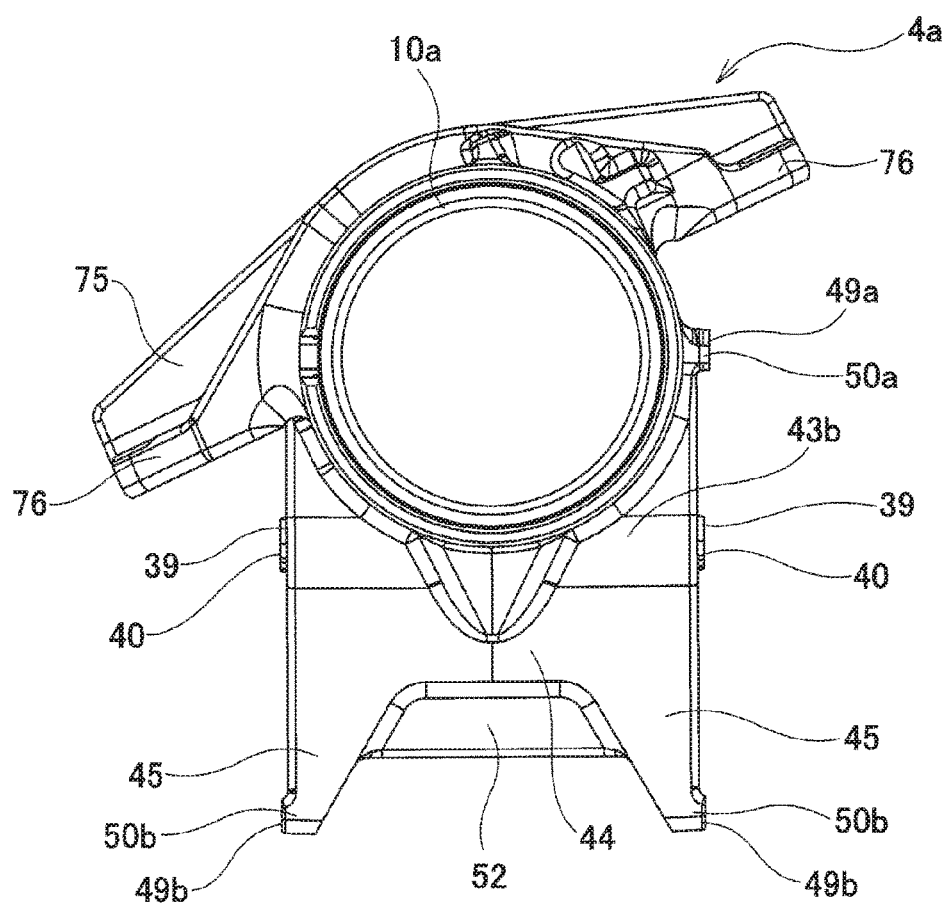
FIG. 11 is a rear side end surface diagram of the outer column and the inner column of FIG. 7 viewed from the right side.

In this example, as shown in FIG. 7, dimensions (X,Z) of the acting surfaces 49a and 49b disposed on the upper side and the lower side of the outer column 11a in the forward and rearward direction are larger than a dimension (Y) of the acting surface 40 in the forward and rearward direction (X>Y and Z>Y). In addition, the dimension (X) of the acting surface 49a in the forward and rearward direction is substantially the same as the dimension (Z) of the acting surface 49b in the forward and rearward direction (X Z). In other words, a distance from a central portion of the telescopic adjustment slot 21a in the forward and rearward direction to a front edge of the acting surface 49a is set to be substantially the same as a distance from a central portion of the slot 21a in the forward and rearward direction to a rear edge of the acting surface 49a. The same applies to front edges and rear edges of the acting surface 49b and the acting surface 40.

The acting surface 40 of the clamp part 38 may substantially have a symmetrical shape with respect to a predetermined symmetry axis, and may by asymmetric with respect to the symmetry axis. Furthermore, in the axial direction, a center of the clamp part 38 (and/or the center of the acting surface 40) may coincide with and be offset from centers of the acting surface 49a and the acting surface 49b. A shape and/or a structure of the clamp part 38 may be set to be offset with respect to the acting surface 49a and the acting surface 49b in the axial direction. For example, the center of the clamp part 38 (and/or the center of the acting surface 40) can be located in front of (or behind) the centers of the acting surface 49a and the acting surface 49b of the outer column 11a. The center of the telescopic adjustment slot 21a may coincide with and be offset from at least one of the acting surface 49a, the acting surface 49b, and the acting surface 40 in the axial direction. For example, the center of the acting surface 40 in the clamp part 38 can be located in front of the center of the slot 21a. In this example, the acting surface 40 is offset in the axial direction so that an operational force of an adjusting lever 26a cannot be changed even when front and rear positions of the steering wheel 1 are changed (refer to FIG. 21). To be specific, when the steering wheel 1 is maximally displaced toward a rear side, a fitting margin of a rear end section of the inner column 10a and a front end section of the outer column 11a is relatively short, and the acting surface 40 tightens a rear-end-side portion of the inner column 10a. In this case, since a rigidity of the rear-end-side portion of the inner column 10a is lower than that of an intermediate portion thereof, a tightening reaction force thereof is relatively low, and the operational force of the adjusting lever 26a is relatively low. Thus, the acting surface 40 is offset forward so that the intermediate portion with a higher rigidity than that of the rear-end-side portion in the inner column 10a is pressed, and thus a high tightening reaction force is obtained. Moreover, a change in a rigidity of the inner column 10a along with a positional adjustment of the front and rear position is relatively small, a change in the tightening reaction force is small in a state in which the steering wheel 1 is located relatively forward, and a fitting margin of the inner column 10a and the outer column 11a is large. In other words, a change in the operational force of the adjusting lever 26a along with a change in the front and rear position of the steering wheel 1 is minimized over the whole position adjustment range due to the above-described offset.

In this example, upper end sections of the joining parts 43a and 43b in the reinforcing bridge part 41 are continuous with both end sections of the ridge parts 50a and 50b in the forward and rearward direction. Here, in this example, outer surfaces of the joining parts 43a and 43b in the width direction are located (offset) closer to insides of the outer column 11a in the width direction than the acting surface 49a, the acting surface 49b, and the acting surface 40. In this case, the inner surfaces of the support plates 22a and 22a in the upper bracket 17a can be set so as not to substantially come into contact with the outer surfaces of the joining parts 43a and 43b in the width direction.

In this example, a support mechanism (a posture holding mechanism) 105 configured to hold a posture of the outer column 11a itself with respect to the inner column 10a is provided on the outer column 11a. The support mechanism 105 includes a roller 70 and a shaft part 58 configured to rotatably support the roller 70. The roller 70 is disposed near a front end section of the cylindrical body 35 of the outer column 11a and is arranged to be in contact with a circumferential surface of the inner column 10a. An attachment part 54 is provided on a portion of the shaft part 58 which is adjacent to one side of the axial slit 36 in the width direction on a front end section of the outer column 11a (the frame body 34) having an axis of rotation in a direction (the width direction and the second direction) which intersects (is orthogonal to) the axial direction of the outer column 11a in a state in which the attachment part 54 extends downward (in a state in which the attachment part 54 extends forward from the joining part 43a). A flat-shaped screw hole 55 configured to pass through the attachment part 54 in the width direction is formed in the attachment part 54. A shoulder bolt 56 disposed in the width direction (a horizontal direction) is fixed in a cantilevered manner to the attachment part 54 from an inside thereof in the width direction. The shoulder bolt 56 has a head 57 and the shaft part 58. A hexagon hole 59 is formed in the head 57. The shaft part 58 has a large diameter section 60 on a proximal end side thereof and a small diameter section 61 on a distal end side thereof. An outer circumferential surface of the large diameter section 60 has a cylindrical surface shape. A male threaded section 62 is formed in an outer circumferential surface of a first half of the small diameter section 61. The male threaded section 62 formed in the small diameter section 61 is screwed on a female threaded section 63 formed in an inner circumferential surface of the screw hole 55, and the shoulder bolt 56 is fixed to the attachment part 54.

A rolling bearing (a radial bearing) 64 is provided around the large diameter section 60. The rolling bearing 64 has an outer ring 65 and an inner ring 66 having an annular ring shape and made of a metal, and rolling elements (for example, balls and rollers) 67 and 67. The rolling elements 67 and 67 are provided to freely roll between an outer ring raceway formed in an inner circumferential surface of the outer ring 65 and an inner ring raceway formed in an outer circumferential surface of the inner ring 66. The inner ring 66 is externally engaged with and fixed to the large diameter section 60. A cylindrical spacer (collar) 68 is externally engaged with a base half of the small diameter section 61. The inner ring 66 is sandwiched from both sides of the shoulder bolt 56 in the axial direction between the spacer 68 and the head 57. A collar 69 made of, for example, a synthetic resin such as a polyamide resin (nylon), a polytetrafluoroethylene (PTFE) resin, an elastic material made of rubber, or the like is externally engaged with an outer circumferential surface of the outer ring 65. In this example, the roller (a pressing member) 70 includes the outer ring 65 and the collar 69, and can rotate around the shoulder bolt 56.

In this example, a position of the roller 70 with respect to the inner column 10a is set such that a reference posture is maintained. For example, in the case of a state in which central axes of the inner column 10a and the outer column 11a substantially coincide with each other (the reference posture), an outer circumferential surface of the roller 70 is in contact with a lower surface of the inner column 10a. To be more specific, an upper surface (an upper end surface) of the roller 70 is in contact with a lower surface of a central portion of the inner column 10a in the width direction. In the support mechanism (the posture holding mechanism) 105, the roller 70 is elastically support on an axial center of the outer column 11a on the basis of a material, a support structure (a cantilever fixed structure), a structure of an installation location (a cutout structure in the outer column 11a), and the like. Alternatively and/or additionally, the support mechanism 105 can have other structures.

Note that, in this example, particularly with regard to a basic constitution of the outer column 11a, a brief description from another viewpoint will be provided. A pair of sandwiched plates are integrally formed with the outer column 11a in a state in which the axial slit 36 is sandwiched from both sides thereof in the width direction by the sandwiched plates, and distal end sections (lower end sections) of the sandwiched plates are joined in the width direction to the outer column 11a in this example (by a portion corresponding to the reinforcing plate 42). Moreover, outer surfaces of the sandwiched plates in the width direction are set as tightening surfaces with a substantially flat surface shape. The gaps (the slits) 47 and 47 with the substantially U shape and which communicate with an inner circumferential surface of the outer column 11a are formed in substantially central positions of the tightening surfaces, and portions enclosed by the gaps 47 and 47 are set as the clamp parts 38 and 38. Moreover, upper sides and lower sides of the tightening surfaces are set as the acting surfaces 49a and 49b.

As shown in FIGS. 1 and 28 to 30, the upper bracket (the support bracket) 17a is constituted of, for example, a metal plate of a steel-based alloy, an aluminum-based alloy, and the like with sufficient rigidity. The upper bracket 17a includes an attachment plate 71 and the pair of support plates 22a and 22a. The attachment plate 71 is normally supported on the vehicle body 15a. The attachment plate 71 is configured to be detached forward such that a forward displacement of the outer column 11a is allowed on the basis of an impact, such as a secondary collision. A pair of locking cutouts 72 and 72 are formed in a rear edge of the attachment plate 71 in a state in which the locking cutouts 72 and 72 are open. Locking capsules 18a and 18a fixed to the vehicle body 15a using fixing members such as bolts or studs are locked into the locking cutouts 72 and 72.

The support plates 22a and 22a are provided to hang from the attachment plate 71. Furthermore, the support plates 22a and 22a are provided to be parallel to each other in a state in which the front end section (the frame body 34 and the reinforcing bridge part 41) of the outer column 11a is sandwiched from both sides thereof in the width direction by the support plates 22a and 22a. The pair of support plates 22a and 22a are arranged on both of the sides of the outer column 11a in the width direction (the second direction). At least tilt adjustment slots (second through holes) 23a and 23a extending in the vertical direction (the first direction) are formed in the support plates 22a and 22a. The slots 23a and 23a are provided in opposing positions (positions matching each other) in the width direction. Furthermore, the slots 23a and 23a are provided to match a portion of the telescopic adjustment slots 21a and 21a in the forward and rearward direction. The slots 23a and 23a have long axes in the vertical direction (the first direction). The support plates 22a and 22a are arranged to be able to tighten the outer column 11a (the steering column 4a) using the tightening mechanism 101. The tightening mechanism 101 includes the adjusting rod 24a, an adjusting nut 25, the adjusting lever 26a, and the like (refer to FIG. 1). The adjusting rod 24a is inserted through the telescopic adjustment slots 21a and 21a and the tilt adjustment slots 23a and 23a in the width direction.

The adjusting rod 24a includes an anchor part disposed on one end section thereof, a male screw part formed at the other end section thereof, and a shaft part formed on an intermediate portion in the width direction (an axial direction of the adjusting rod 24a; the second direction). The adjusting rod 24a is disposed to be inserted through the telescopic adjustment slots 21a and 21a and the tilt adjustment slots 23a and 23a. The anchor part is provided on one end side of the adjusting rod 24a in the width direction. The anchor part is relatively non-rotatably engaged with the tilt adjustment slot 23a formed in one of the support plates 22a. A cam device 73, which is constituted of a driving-side cam and a driven-side cam, and the adjusting lever 26a are provided in the vicinity of a portion of the adjusting rod 24a (the shaft part) which protrudes in the width direction from an outer surface of the other support plate 22a in the width direction. A nut 74 is screwed on the male screw part. The driving-side cam of the cam device 73 is rotated relative to the driven-side cam on the basis of a rocking operation of the adjusting lever 26a in the tightening mechanism 101 so that a width dimension (a dimension of the adjusting rod 24a in the axial direction) of the cam device 73 is expandable and contractable.

In this example, the steering device includes a steering lock device serving as a type of vehicle anti-theft device. In the outer column 11a, a locking through hole 33a is formed in the cylindrical body 35 to pass therethrough in a radial direction. A fixed part 75 configured to support and fix a lock unit (not shown) is provided on a portion in an outer circumferential surface of the cylindrical body 35 which is shifted from the locking through hole 33a in the circumferential direction. A pair of attachment flanges 76 and 76 are provided on the fixed part 75. The lock unit is supported by and fixed to the vicinity of the locking through hole 33a using the attachment flanges 76 and 76, and a key lock collar (not shown) is externally-fitted (press-fitted) to the steering shaft 2a. The key lock collar is arranged at a portion at which phases of the key lock collar and the lock unit coincide with each other at a part of the steering shaft 2a in the axial direction. When an ignition key is switched off in the lock unit, a distal end section of a lock pin in the lock unit is displaced toward an inner diameter of the outer column 11a and is engaged with a key lock depressed portion formed in an outer circumferential surface of the key lock collar. Thus, the steering shaft 2a cannot be substantially rotated. That is to say, the key lock depressed portion is engaged with the distal end section of the lock pin in a state in which the steering shaft 2a cannot be substantially rotated at a time of key locking. A predetermined value (for example, a value defined by key lock regulations; a limit value) used to release a non-rotatable state is set for the lock unit. Rotation of the steering shaft 2a by a force with an extent that the steering wheel 1 (refer to FIG. 44) is operated by a normal driving posture is prevented. When the steering wheel 1 (refer to FIG. 22) is rotated using a force greater than or equal to the predetermined value, the steering shaft 2a is allowed to rotate with respect to the key lock collar and the steering column 4a.

In this example with the above-described constitution, the tightening mechanism 101 has a first state (a first form and a first mode) in which the outer column 11a (the steering column 4a) is tightened through the upper bracket (the support bracket) 17a and a second state (a second form and a second mode) in which the tightening is released.

When the steering wheel 1 is moved to a desired position and is then held at a desired position, the adjusting lever 26a of the tightening mechanism 101 is rocked (turned) about the adjusting rod 24a in a predetermined direction (generally, upward). As a result, a width dimension of the cam device 73 increases, and an interval between the inner surfaces of the support plates 22a and 22a decreases. The acting surfaces 49a and 49a, the acting surfaces 49b and 49b, and the acting surfaces 40 and 40 of the clamp parts 38 and 38 are pressed inwardly in the width direction by the inner surfaces of the support plates 22a and 22a. Intermediate portions of the support plates 22a and 22a in the vertical direction and the clamp parts 38 and 38 are bent (elastically deformed) inwardly in the width direction (toward an axial center), and an outer circumferential surface of the inner column 10a is accordingly elastically sandwiched (held) (is tightened in the tightening direction (the second direction)). Thus, the steering wheel 1 is held in the adjusted position.

On the other hand, when a position of the steering wheel 1 is adjusted, the adjusting lever 26a is rocked (turned) in an opposite direction (generally, downward) to the predetermined direction. As a result, the width dimension of the cam device 73 decreases, and the interval between the inner surfaces of the support plates 22a and 22a increases. Since a pressing force (a tightening force) by the support plates 22a and 22a decreases, a width dimension between the clamp parts 38 and 38 elastically increases, and a holding force of the outer circumferential surface of the inner column 10a decreases (the tightening is released). In the second state, the front and rear position and the vertical position of the steering wheel 1 can be adjusted in a range in which the adjusting rod 24a can be moved within the telescopic adjustment slots 21a and 21a and the tilt adjustment slots 23a and 23a.

In the steering device of this example, the acting surfaces 49a and 49a, the acting surfaces 49b and 49b, and the acting surfaces 40 and 40 of the clamp parts 38 and 38 are provided on both of the sides of the outer column 11a in the width direction (the second direction and the tightening direction). The acting surfaces 49a and 49a and the acting surface 49b and 49b are directly pressed onto the support plates 22a and 22a of the upper bracket 17a in a tightened state (the first state). The acting surfaces 40 and 40 of the clamp parts 38 and 38 are indirectly pressed onto the support plates 22a and 22a in the tightened state (the first state). The acting surface (the first surface) 49a, the acting surface (the second surface) 49b, and the acting surface (the third surface) 40 are substantially independent of each other. The acting surfaces 49a and 49a and the acting surface 49b and 49b are provided on the frame body 34 of the outer column 11a, and positions thereof with respect to the inner column 10a do not substantially change, or amounts of displacement thereof are slight while transitioning from the released state (the second state) to the tightened state (the first state). A position of the acting surface 40 of the clamp part 38 with respect to the inner column 10a changes with a relatively large amount of displacement (is displaced toward the inner column 10a) (a displacement surface) while transitioning from the released state (the second state) to the tightened state (the first state). In the first state, the outer column 11a and the support plates 22a and 22a are coupled to each other by a force acting on the acting surfaces 49a and 49a mainly at a position near the central axis of the outer column 11a. In the first state, the outer column 11a and the support plates 22a and 22a are coupled to each other by a force acting on the acting surface 49b and 49b mainly at a position away from the central axis of the outer column 11a. In the first state, the inner column 10a is held mainly in the outer column 11a through the clamp part 38 by a force acting on the acting surfaces 40 and 40. Therefore, in the steering device in this example, securing strength of the outer column 11a and securing a holding force of the inner column 10a are simultaneously and independently realized, and a position adjusting mechanism with high stability is provided.

Figure 22:
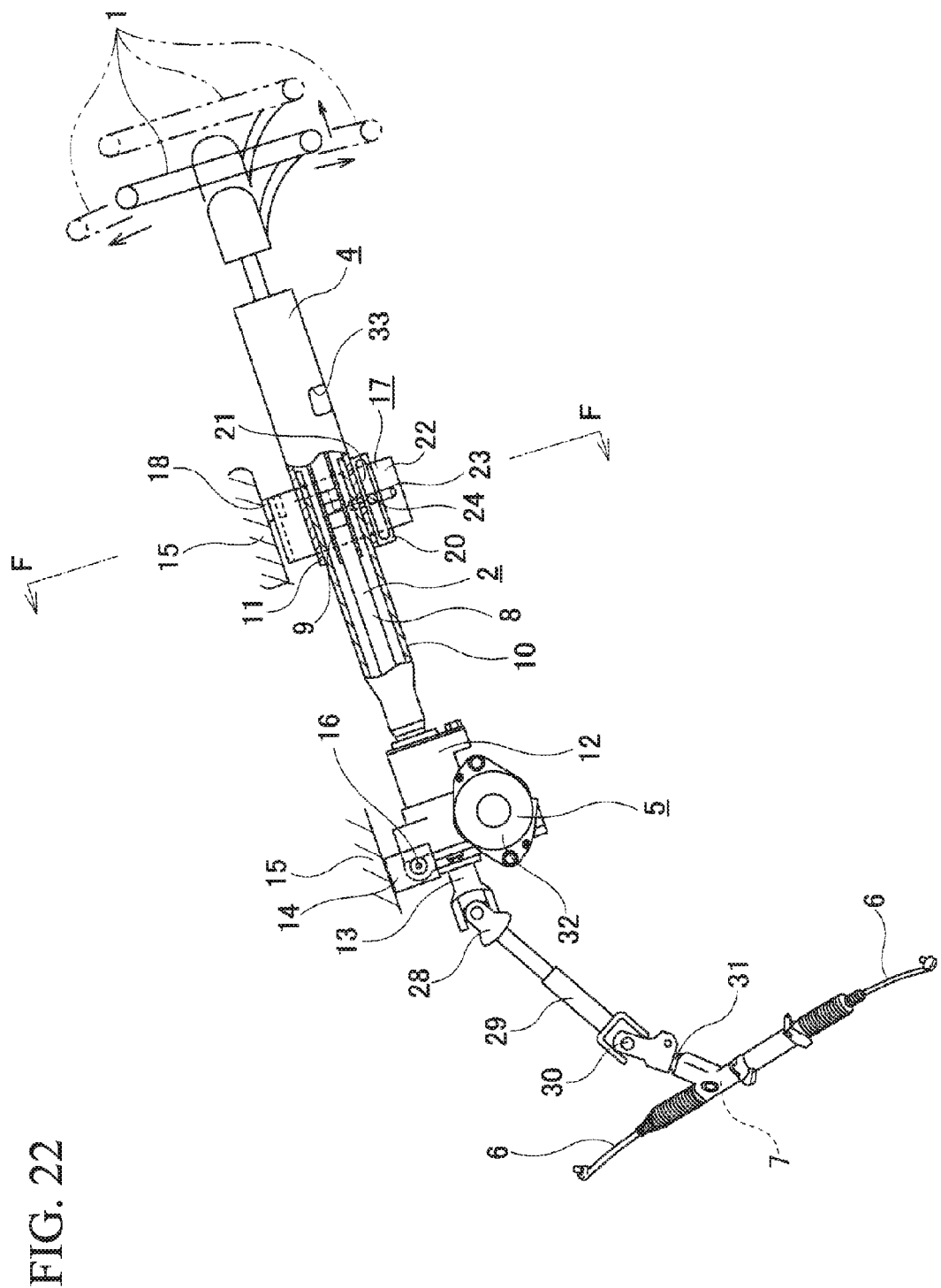
FIG. 22 is a schematic side view illustrating an example of a steering device with a conventional structure.
Figure 23:
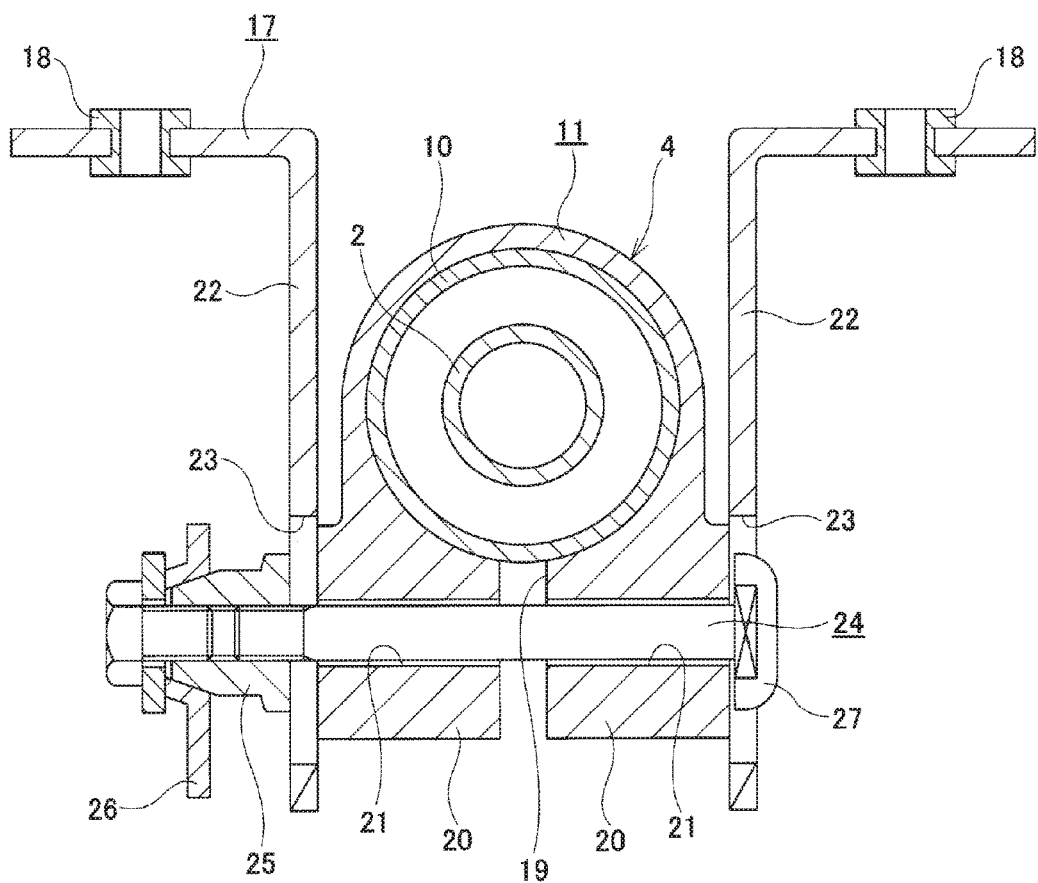
FIG. 23 is a cross-sectional view taken along line F-F of FIG. 22.

FIGS. 22 and 23 illustrate the conventional steering device disclosed in Patent Literature 1. In the conventional steering device, a front and rear position and a vertical position of a steering wheel 1 needs to be able to be adjusted, and an outer column 11 is movably supported on an upper bracket 17 in a forward and rearward direction and a vertical direction. A slit 19 extending in an axial direction of the outer column 11 is formed in a lower surface of a front end section of the outer column 11. A pair of clamp parts 20 and 20 are integrally formed with the outer column 11 in a state in which the slit 19 is sandwiched from both sides thereof in a width direction by the clamp parts 20 and 20. Moreover, telescopic adjustment slots 21 and 21, which are elongated in the forward and rearward direction, are formed at positions in which the clamp parts 20 and 20 are mutually matched. In addition, a pair of support plates 22 and 22 are provided in the upper bracket 17 in a state in which the clamp parts 20 and 20 are sandwiched from both sides thereof in the width direction by support plates 22 and 22. Tilt adjustment slots 23 and 23 which are elongated in the vertical direction are formed in portions at which the support plates 22 and 22 partially match, and which partially match the telescopic adjustment slots 21 and 21 in the forward and rearward direction. An adjusting rod 24 is inserted through the telescopic adjustment slots 21 and 21 and the tilt adjustment slots 23 and 23 in the width direction (the right to the left of FIG. 23) in a state in which the clamp parts 20 and 20 are sandwiched by the support plates 22 and 22 of the upper bracket 17. The adjusting nut 25 is screwed on another end of the adjusting rod 24. The adjusting nut 25 can be rotated through an adjusting lever 26.

In the conventional steering device, the adjusting nut 25 is rotated on the basis of an operation of the adjusting lever 26. The outer column 11 is fixed to the upper bracket 17 or the fixing is released along with a change in an interval between the adjusting nut 25, the anchor part 27, and the adjusting rod 24. In addition, the outer column 11 is fixed to an inner column 10 or the fixing is released along with an interval between the clamp parts 20 and 20. The adjusting rod 24 can be displaced inside the telescopic adjustment slots 21 and 21 in the forward and rearward direction in a state in which an interval between the adjusting nut 25 and the anchor part 27 increases. The outer column 11 is moved forward and rearward (is displaced relative to the inner column 10) in such a displaceable range (a telescopic adjustment range) so that the front and rear position of the steering wheel 1 can be adjusted. In addition, the adjusting rod 24 can be displaced inside the tilt adjustment slots 23 and 23 in a substantially vertical direction. The vertical position of the steering wheel 1 can be adjusted in such a displaceable range (a tilt adjustment range). At this time, a steering column 4 is rocked and displaced about a tilt shaft 16 in the vertical direction.

A front end section of an output shaft 13 in a steering force auxiliary device 5 is joined to a rear end section of an intermediate shaft 29 through a universal joint 28. An input shaft 31 of a steering gear unit 7 is joined to a front end section of the intermediate shaft 29 through another universal joint 30. The steering gear unit 7 includes a rack and a pinion (which are not shown), and the input shaft 31 is coupled to the pinion. Both end sections of the rack meshed with the pinion are joined to tie rods 6 and 6. The tie rods 6 and 6 are pushed and pulled on the basis of a displacement of the rack in the axial direction so that a desired steering angle is given to a steering wheel 3 (refer to FIG. 21). The steering force auxiliary device 5 can give auxiliary torque at a predetermined size in a predetermined direction to the output shaft 13 through a worm speed reducer using an electric motor 32.

In the conventional steering device, when frictional forces between inner surfaces of the support plates 22 and 22 and outer surfaces of the clamp parts 20 and 20 decrease due to an operation in which a position of the steering wheel 1 needs to be able to be adjusted and which is performed through the adjusting lever 26, a rear end section of the outer column 11 is tilted downward in some cases. This is because a downward force acts on the rear end section of the outer column 11 through an outer shaft 9 on the basis of a weight of the steering wheel 1. A gap with a certain size is provided between an inner circumferential surface of the outer column 11 and an outer circumferential surface of the inner column 10 due to relative displacement in the axial direction between the inner column 10 and the outer column 11.

Figure 24:
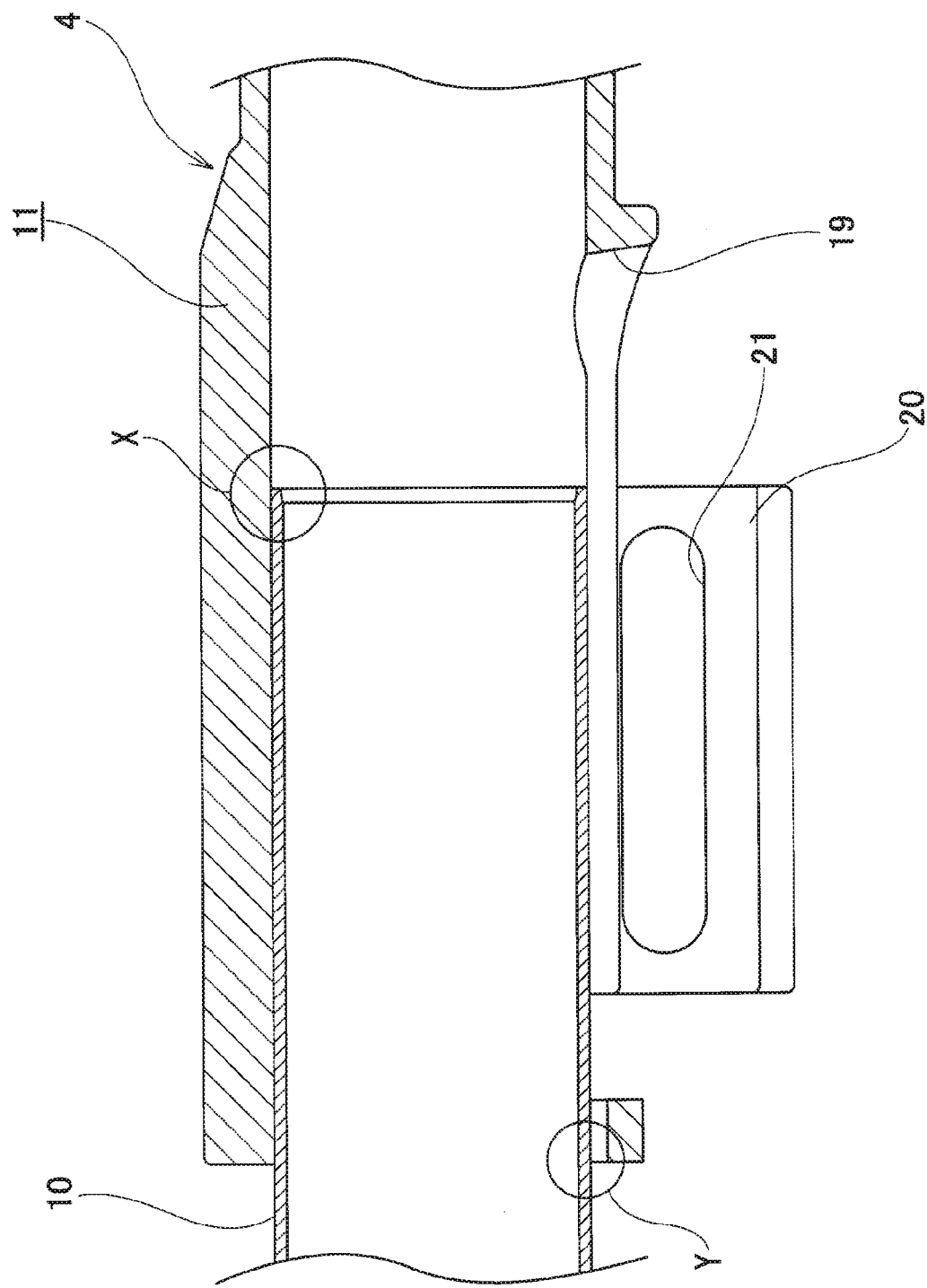
FIG. 24 is a partial cross-sectional view for describing a problem of the steering device with the conventional structure.

In this case, a contact state of a contact portion, which is in a portion X indicated by a circle in FIG. 24, of an upper end section of a rear edge of the inner column 10 and an inner circumferential surface of the outer column 11 is a line contact. In addition, a contact state of a contact portion, which is in a portion Y indicated by a circle in FIG. 24, of a lower end section of a front edge of the outer column 11 and an outer circumferential surface of the inner column 10 is a line contact. As a result, when the front and rear position of the steering wheel 1 needs to be able to be adjusted and the outer column 11 is displaced relative to the inner column 10, the outer column 11 is likely to catch the inner column 10 (to twist). This phenomenon reduces an operational feeling of adjusting the front and rear position of the steering wheel 1 and causes an operational load in the forward and rearward direction. Particularly, in the case of a column type electric power steering device (a column type electric power steering (EPS) device) in which the steering force auxiliary device 5 is combined with a steering column 2 like in the illustrated structure, a fit length of the inner column 10 and the outer column 11 is set to be relatively short due to restrictions on an installation space of the steering column 4. As a result, an angle of inclination of the outer column 11 easily increases, and thus the above-described problem easily occurs. A new problem occurs in that processing costs increase due to precision machining such as a task of reducing a gap between an outer column and an inner column and chamfering performed on an outer circumferential edge of an end section of the inner column.

Particularly, in the steering device in this example, an operational feeling of adjusting the front and rear position of the steering wheel 1 can be improved, and an operational load can be suppressed to be small. That is to say, in this example, an outer circumferential surface of the roller 70 is in contact with the lower surface of the central portion of the inner column 10a in the width direction in a state in which the roller 70 is rotatably supported on a lower portion of the front end section of the outer column 11a, and central axes of the inner column 10a and the outer column 11a coincide with each other. A rear end section of the outer column 11a can be prevented from tilting downward (a front end section of the outer column 11a can be prevented from tilting upward) on the basis of a gap between the inner circumferential surface of the outer column 11a and the outer circumferential surface of the inner column 10a even when the interval between the inner surfaces of the support plates 22a and 22a increases. In other words, tilting of the outer column 11a based on such a gap is prevented when the outer circumferential surface of the roller 70 presses the outer circumferential surface of the inner column 10a such that the outer circumferential surface of the inner column 10a faces upward. For this reason, a state in which the central axis of the outer column 11a coincides with the central axis of the inner column 10a is substantially maintained (the reference posture is maintained). Accordingly, a state in which a central axis of the outer shaft 9a coincides with a central axis of the inner shaft 8 is substantially maintained (misalignment in a spline part is prevented). In this example, direct contact between a lower end section of a front edge of the outer column 11a and the outer circumferential surface of the inner column 10a is prevented. Direct contact between an upper end section of a rear edge of the inner column 10a and the inner circumferential surface of the outer column 11a is prevented. Therefore, when the front and rear position of the steering wheel 1 is adjusted, the occurrence of catching (twisting) can be effectively prevented. An operational feeling of adjusting the front and rear position of the steering wheel 1 can be improved, and thus an operational load can be suppressed to be small when the front and rear position thereof is adjusted.

Moreover, in this example, when the front and rear position of the steering wheel 1 needs to be able to be adjusted and the outer column 11a is displaced in the forward and rearward direction relative to the inner column 10a, the roller 70 can travel along the lower surface of the inner column 10a. For this reason, frictional resistance generated when the outer column 11a is displaced in the forward and rearward direction relative to the inner column 10a is suppressed to be small. Moreover, since the outer circumferential surface of the roller 70 is constituted of the collar 69 made of a synthetic resin, sliding based on a contact between metals is prevented, and thus the roller 70 can be effectively rotated. In addition, a variation of the gap between the outer circumferential surface of the inner column 10a and the inner circumferential surface of the outer column 11a is prevented by providing an elastic structure in the support mechanism (the posture holding mechanism), such as by elastically deformation of the collar 69. Moreover, in this example, since the roller 70 is supported using the shoulder bolt 56 fixed to the attachment part 54 of the outer column 11a by screws, the roller 70 can be easily attached to the outer column 11a (ease of assembly is good). Moreover, since the roller 70 is located in the central portion of the inner column 10a in the width direction, inclination of the outer column 11a with respect to the inner column 10a is effectively prevented using one roller 70, and thus the outer column 11a can be smoothly moved in the forward and rearward direction.

In this example, even when a total length of the outer column 11a is short such as when a constitution of the column EPS is adopted, the occurrence of catching (twisting) can be prevented, an operational feeling of adjusting the front and rear position of the steering wheel 1 can be improved, and thus an operational load can be suppressed to be small when the front and rear position thereof is adjusted.

Figure 1:
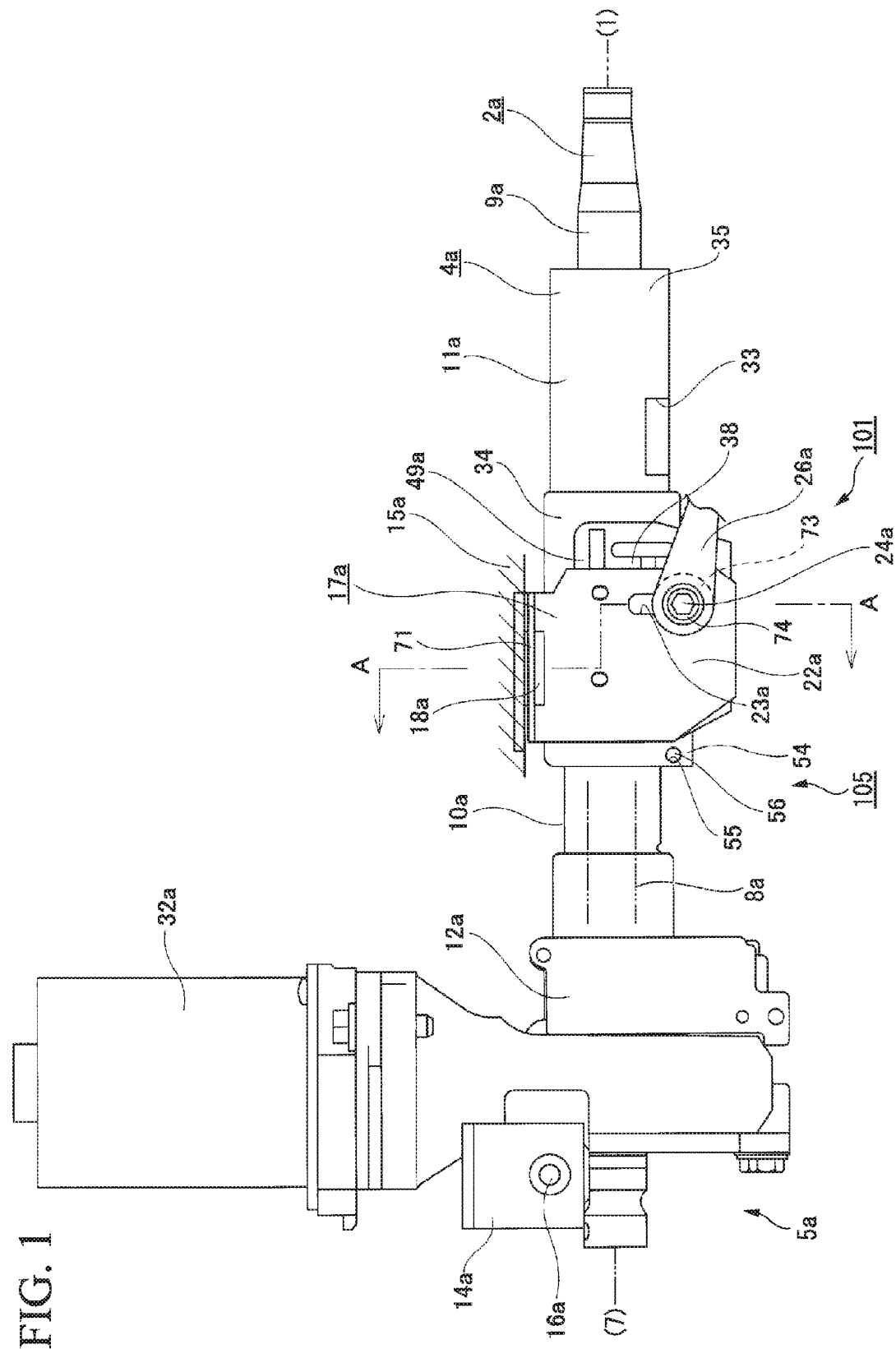
FIG. 1 is a side view of a steering device illustrating a first example according to an embodiment of the present invention.
Figure 2:
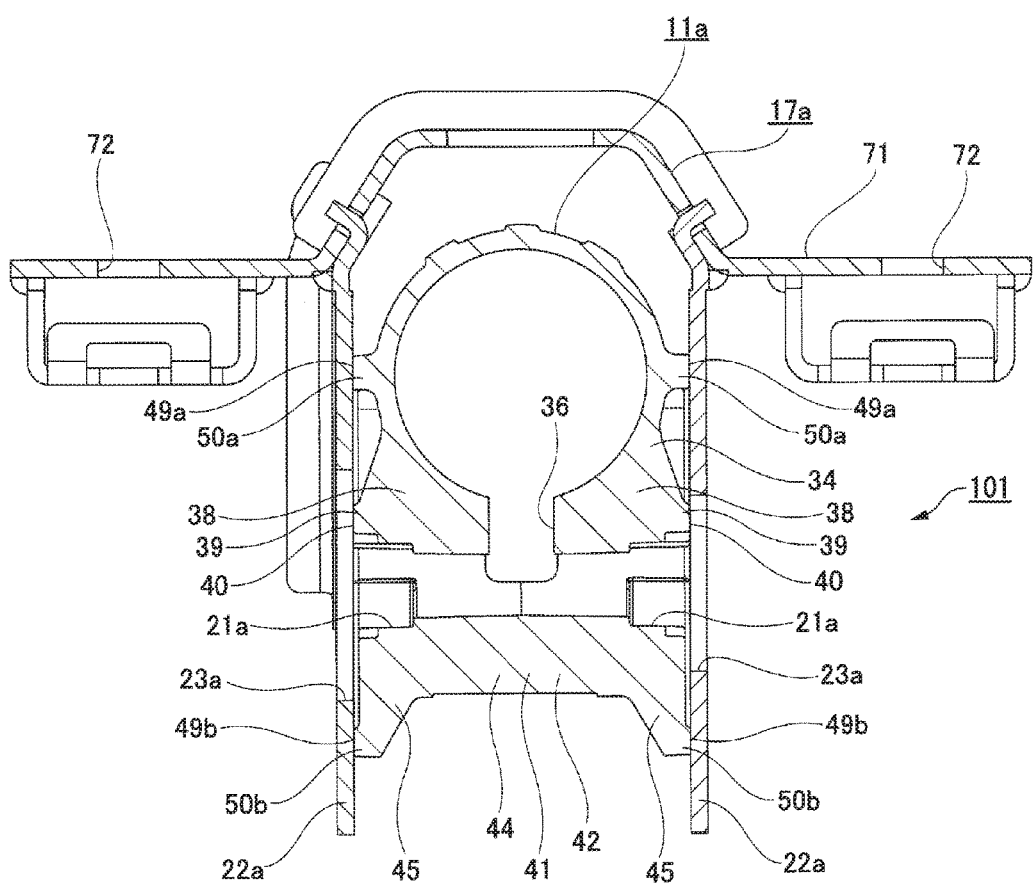
FIG. 2 is an enlarged cross-sectional view taken along line A-O-O-A of FIG. 1, a part of which is omitted.
Figure 3:
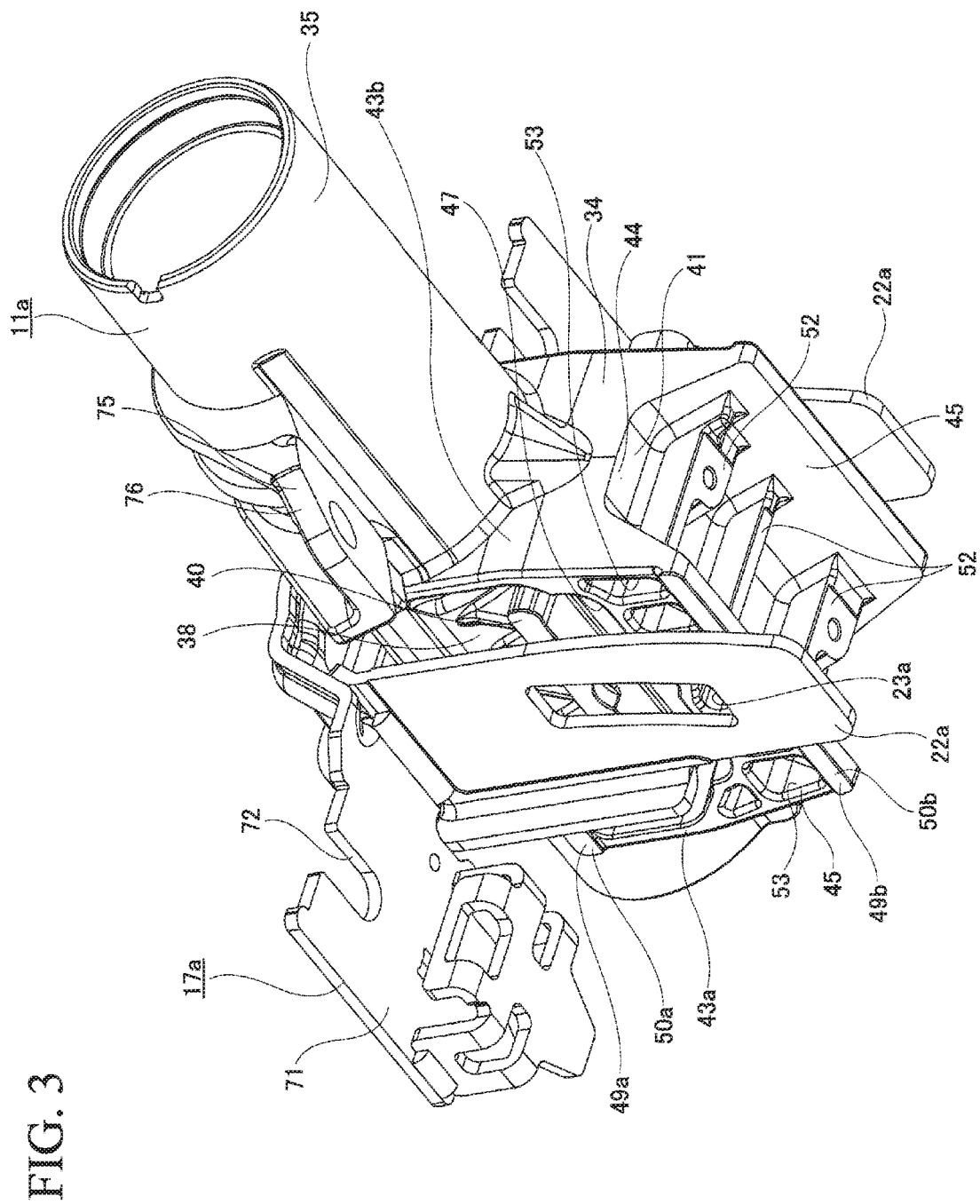
FIG. 3 is a perspective view of an outer column and an upper bracket which are taken out and viewed from the rear and below.
Figure 4:
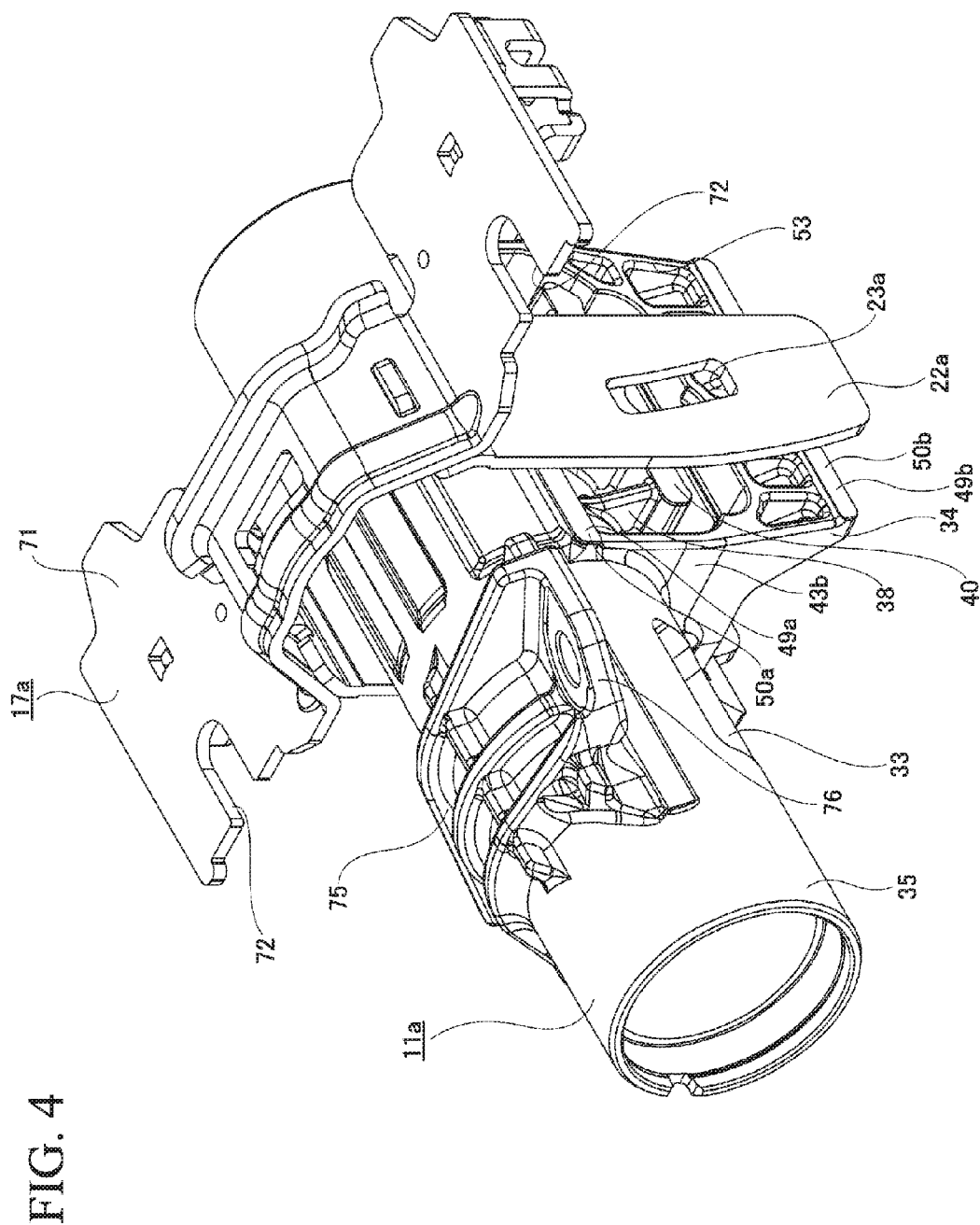
FIG. 4 is a perspective view of the outer column and the upper bracket which are taken out and viewed from the rear and above.
Figure 5:
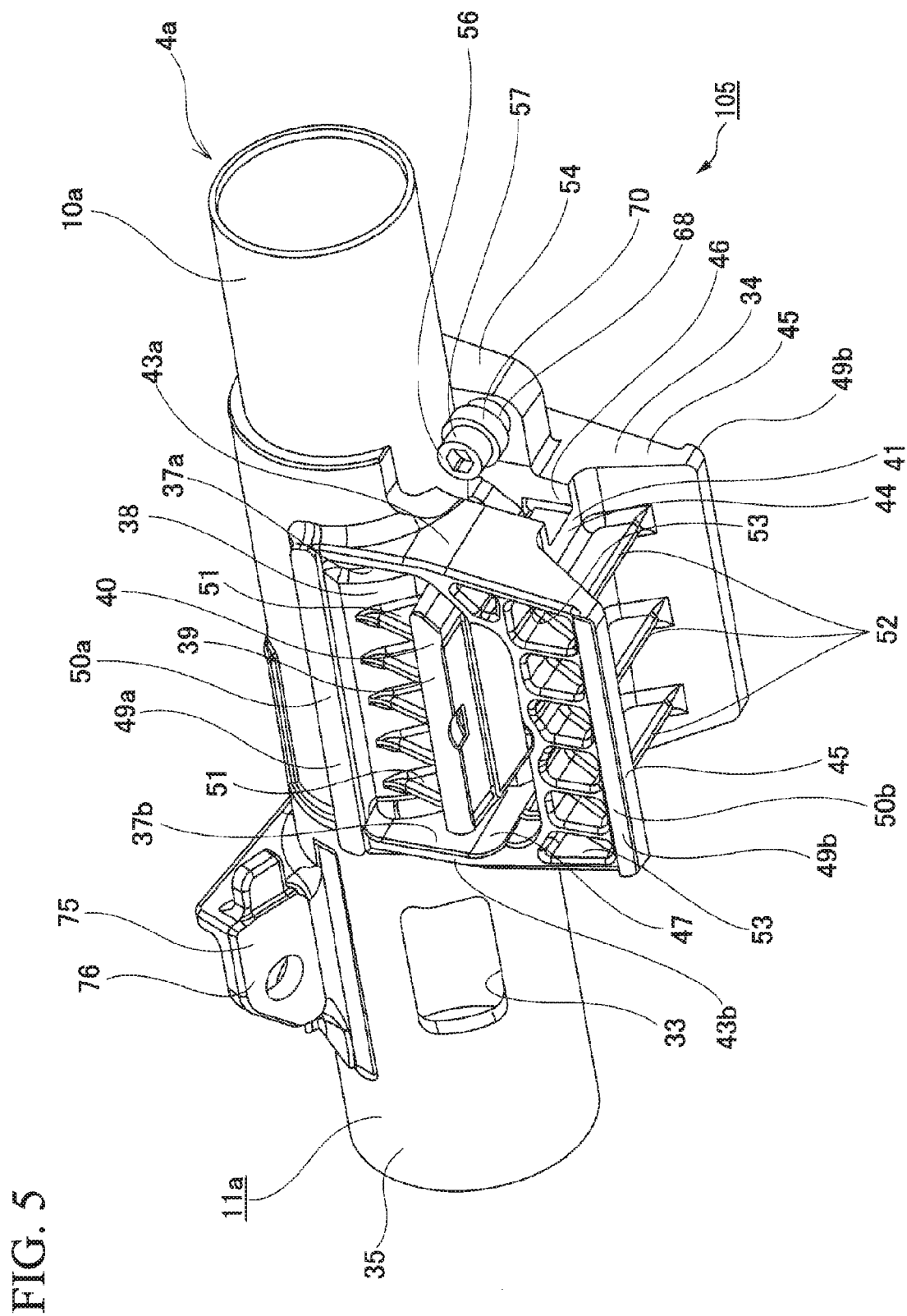
FIG. 5 is a perspective view of the outer column and an inner column (a telescopic steering column) which are taken out and viewed from the front and below.
Figure 6:
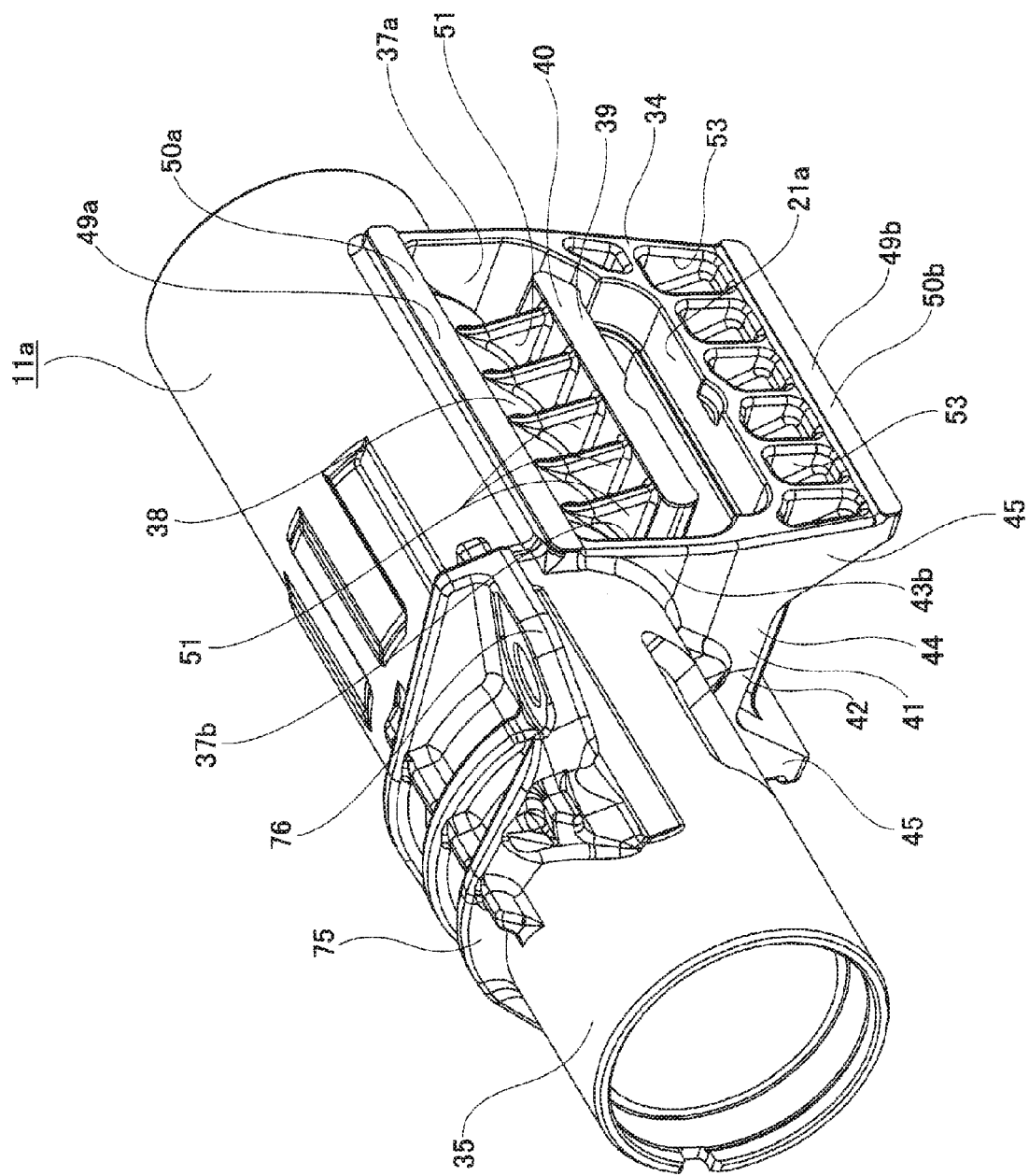
FIG. 6 is a perspective view of the outer column which is taken out and viewed from the front and above.

As shown in FIGS. 2, 3, and the like, in the steering device in this example, the acting surface 40 of the clamp part 38 and the acting surfaces 49a and 49b are separately independently provided on both sides of the outer column 11a in the width direction. The clamp parts 38 and 38 are used for elastically sandwiching the outer circumferential surface of the inner column 10a. On the other hand, for example, when the steering wheel 1 is operated by a large force while the steering lock device and the like is being operated, torque acting on the outer column 11a is transmitted to the inner surfaces of the support plates 22a and 22a of the upper bracket 17a via the acting surfaces 49a and 49b. The clamp parts 38 and 38 may be adopted as long as the clamp parts 38 and 38 can exhibit only a function of sandwiching the inner column 10a. For this reason, it is not necessary to set a high strength higher than or equal that which is necessary. Therefore, in the steering device in this example, desired bending characteristics such as greatly bending the clamp parts 38 and 38 in the width direction can be set for the clamp parts 38 and 38. On the other hand, the acting surfaces 49a and 49b may be adopted as long as the acting surfaces 49a and 49b can exhibit only a function of transmitting the torque. For this reason, it is not necessary to greatly bend sections in which the acting surfaces 49a and 49b in the outer column 11a are installed in the width direction. Therefore, according to the steering device in this example, securing the strength of the outer column 11a can be independently compatible with securing the holding force of the inner column 10a.

Moreover, in the steering device in this example, the inner surfaces of the support plates 22a and 22a are brought into contact with (pressed by) the acting surfaces 49a and 49b to hold the steering wheel 1 at a desired position. At this time, the clamp parts 38 and 38 are bent through the inner surfaces of the support plates 22a and 22a. In the outer column 11a, the acting surfaces 49a and 49b are substantially independent from the acting surface 40 of the clamp part 38, and the portions in which the acting surfaces 49a and 49b are installed have sufficiently high rigidity (bending rigidity and bending characteristics) when compared to the clamp part 38. Furthermore, the acting surface 49a and the acting surface 49b are arranged to be spaced apart from each other in the first direction which intersects the second direction (the tightening direction). Particularly, a position of the acting surface 49b is outside of the range of the external form of the inner column 10a in the first direction, and is outside of a range of an external form of the cylindrical body 35 of the outer column 11a. For this reason, the torque acting on the outer column 11a is absorbed through the acting surfaces 49a and 49b, and thus the torque can be prevented from being transmitted to the clamp part 38.

Second Example of Embodiment

Figure 17:
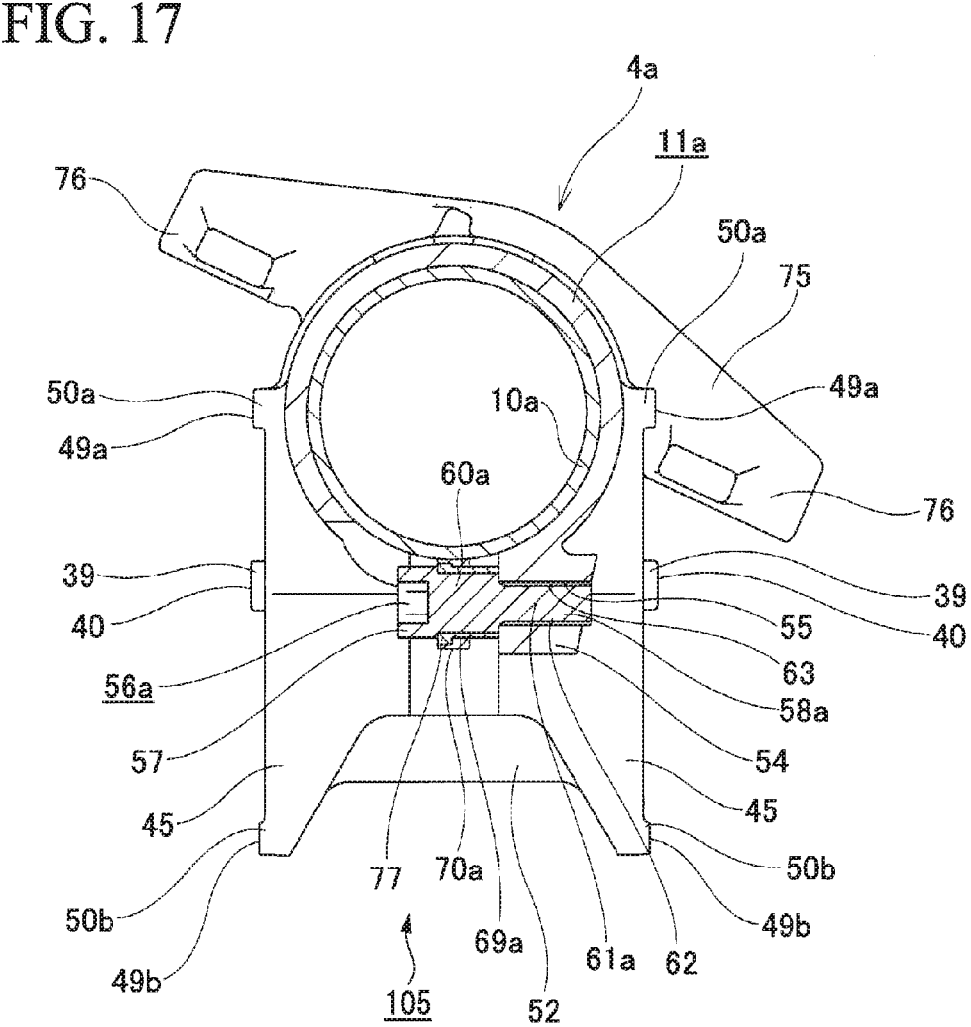
FIG. 17 is a diagram corresponding to FIG. 14 illustrating a second example according to an embodiment of the present invention.
Figure 18:
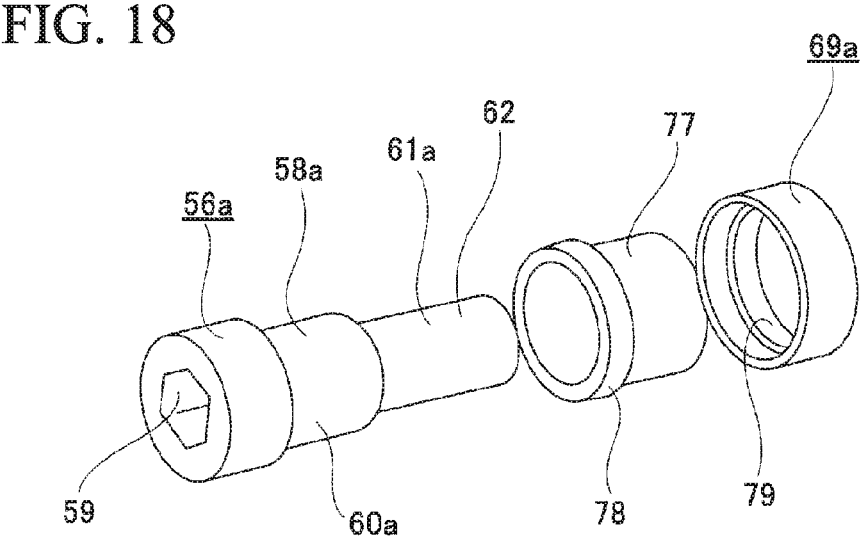
FIG. 18 is a diagram corresponding to FIG. 16.

A second example according to an embodiment of the present invention will be described with reference to FIGS. 17 and 18. In a steering device in this example, a constitution in which a rear end section of an outer column 11a is prevented from tilting downward is simplified compared to the structure of the first example in the above-described embodiment. In the following description, constituent parts which are the same as or equivalent to those of the above-described will be denoted with the same reference numerals, and descriptions thereof will be simplified or omitted.

In this example, a male threaded section 62 is formed over an entire small diameter section 61a on a distal end side constituting a shaft part 58a in a shoulder bolt 56a fixed to an attachment part 54 of the outer column 11a in a cantilevered manner. The male threaded section 62 is screwed into a female threaded section 63 formed in an inner circumferential surface of a screw hole 55 of the attachment part 54. A cylindrical member 77 made of a metal is externally engaged around a large diameter section 60a on a proximal end side of the shaft part 58a in a relatively rotatable manner. An outward flange 78 is provided on one end portion of an outer circumferential surface of the cylindrical member 77 in a width direction. A collar 69a made of a synthetic resin such as a polyamide resin (nylon), a polytetrafluoroethylene (PTFE) resin, an elastic material such as rubber, or the like is externally engaged with one portion of the outer circumferential surface of the cylindrical member 77 including the outward flange 78 in the width direction. An inward flange 79 formed on the other half in the width direction of an inner circumferential surface of the collar 69a comes into contact with the outward flange 78 in the width direction, and thus deviation of the collar 69a in the width direction is prevented. In this example, a roller 70a is constituted of the cylindrical member 77 and the collar 69a having such a constitution.

In the steering device in this example having the above-described constitution, since the cylindrical member 77 having a simple constitution is used instead of a rolling bearing, manufacturing costs can be reduced and a weight of a device can be lowered. Other constitutions and effects are the same as in the case of the first example of the embodiment.

Third Example of Embodiment

Figure 19:
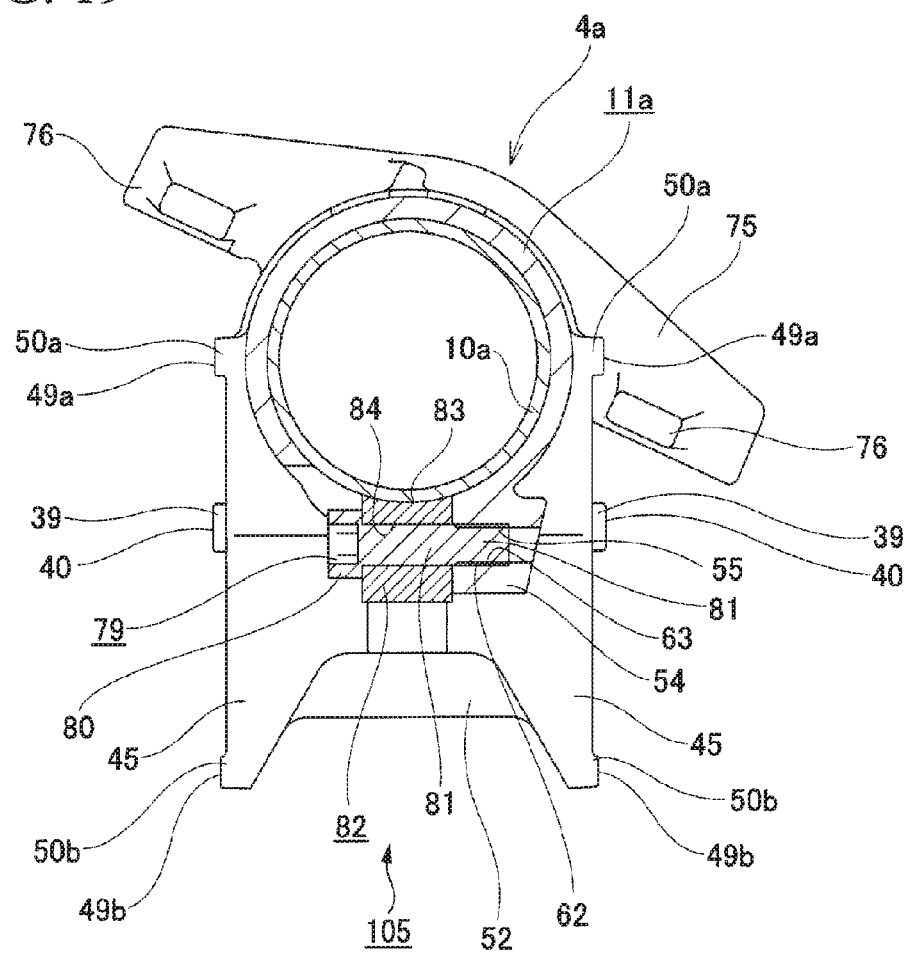
FIG. 19 is a diagram corresponding to FIG. 14 illustrating a third example according to the embodiment of the present invention.
Figure 20:
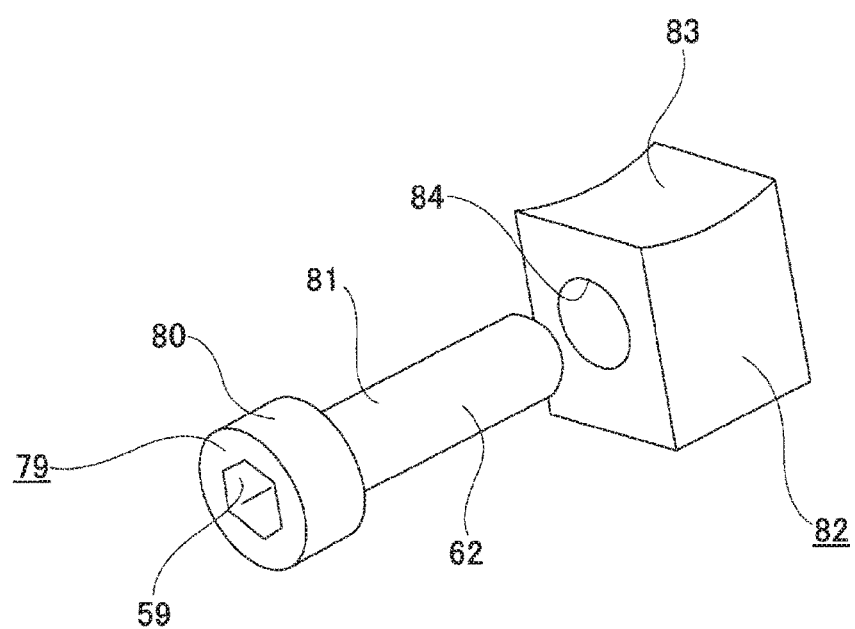
FIG. 20 is a diagram corresponding to FIG. 16.

A third example according to an embodiment of the present invention will be described with reference to FIGS. 19 and 20. In a steering device in this example, a constitution in which a rear end section of an outer column 11a is prevented from tilting downward is simplified like in the second example in the above-described embodiment. In the following description, constituent parts which are the same as or equivalent to those of the above-described will be denoted with the same reference numerals, and descriptions thereof will be simplified or omitted.

In this example, a bolt 79 with no step is fixed to an attachment part 54 of the outer column 11a in a cantilevered manner. The bolt 79 is constituted of a head 80 and a shaft part 81. A male threaded section 62 is formed on a distal end section of the shaft part 81. The male threaded section 62 is screwed into a female threaded section 63 formed in an inner circumferential surface of a screw hole 55 of the attachment part 54. In this example, a substantially quadrangular prismatic pad (block) 82 made of an elastic material is externally engaged around a base half of the shaft part 81. The pad 82 is sandwiched between a head 80 and an inner surface of the attachment part 54 in the width direction. A concave-cylindrical-surface-shaped pressed surface 83 having a radius of curvature which is the same as a radius of curvature of the outer circumferential surface of the inner column 10a is formed in an upper surface of the pad 82. For this reason, when the outer column 11a is displaced relative to the inner column 10a, the pressed surface 83 elastically comes into surface contact with a lower surface of a central portion of the inner column 10a in the width direction. Note that, in this example, a collar made of a metal can also be internally engaged with and fixed to (embedded in) an inner side of a through hole 84 formed in the pad 82. Moreover, low friction coating can also be performed on the pressed surface 83 for the purpose of reducing friction between the pressed surface 83 and a lower surface of the inner column 10a.

In the steering device in this example having the above-described constitution, the number of parts can be reduced and unit prices of constituent parts can be minimized compared to the structures of the examples according to the above-described embodiments. For this reason, manufacturing costs can be more effectively reduced. Other constitutions and effects are the same as in the case of the first example of the embodiment.

Note that constituent elements in the above-described embodiments can be appropriately combined. Furthermore, some of the constituent elements may not be used in some cases. This disclosure relates to all novel and non-obvious features and aspects of variously disclosed embodiments themselves, and various combinations and sub-combinations with other embodiments. The disclosed details and methods are not limited to any particular aspect, technique, or combination, and the disclosed details and methods are not required to have one or more particular advantages or solve a particular problem.

The outer column is not limited to an outer column in which the whole outer column is constituted of a member made of a light alloy such as an aluminum-based alloy and a magnesium-based alloy, and may have a structure in which a frame body made of a light alloy and a cylindrical body made of an iron-based alloy are joined. The steering device may have a structure including both mechanisms of a tilt adjustment mechanism and a telescopic adjustment mechanism, and may have a structure including only the telescopic adjustment mechanism. A formation position of the axial slit and a formation position of the reinforcing bridge part may be opposite to (formed above) those of the above-described aspects in the vertical direction. Furthermore, a steering device having a substantially non-separated structure, as shown in FIGS. 22 and 23, can be adopted instead of a structure in which the acting surface (the pressing surface) of the clamp part and a torque transmission surface are separated.

In one embodiment, the telescopic steering column of the telescopic steering column and the steering device includes the inner column and the outer column. The rear section of the inner column disposed on the front side of the steering column and the front section of the outer column disposed on the rear side of the steering column are fitted to each other to be displaceable with respect to one another in the axial direction so that an entire length thereof can be extended and contracted. Particularly, in the case of the telescopic steering column of the present invention, a pressing member configured to be in contact with the lower surface of the inner column (in a state in which the central axes of the inner column and the outer column coincide with each other) to prevent the rear end section of the outer column from tilting downward (the front end section of the outer column is inclined upward on the basis of the gap) on the basis of the gap between the inner circumferential surface of the outer column and the outer circumferential surface of the inner column (to prevent the front end section of the outer column from tilting upward on the basis of the gap) is provided on the lower portion (for example, the lower end section) of the front section of the outer column.

In one example, when the inner column and the outer column are relatively displaced in the axial direction, the pressing member comes into rolling or surface contact with the lower surface of the inner column.

In one example, all or a part of the pressing member is made of an elastic material. Thus, a variation of the gap between the inner column and the outer column is absorbed by an elastically deformation of the pressing member.

In one example, the pressing member is supported on the outer column using a support member disposed in the width direction (for example, the horizontal direction) of the outer column and fixed to the outer column in the cantilevered manner.

In one example, the shoulder bolt is used as the support member. In this case, the male threaded section of the head and the shaft part (a stepped shaft) constituting the shoulder bolt, which is formed on the distal end portion (the small diameter section) of the shaft part, is screwed into the outer column.

In one example, as the pressing member, the roller rotatably supported around the support member (a proximal end section of the shaft part in the case of claim 5) is used. If the roller is used as the pressing member, the roller supports the lower surface of the inner column while rotating when the outer column and the inner column are relatively displaced in the axial direction so that the rear end section of the outer column is prevented from tilting downward.

In one example, any one of the outer circumferential surface and the inner circumferential surface of the roller can be made of an elastic material (a synthetic resin or rubber). For example, when the outer circumferential surface of the roller is made of an elastic material, an O ring can be externally engaged therewith. Thus, the roller is prevented from coming into sliding contact with the outer circumferential surface of the inner column, and thus the roller can be effectively rotated.

In this example, the pad (the block), in which the surface is in contact with the lower surface of the inner column is set as the concave cylinder surface, can be set as the pressing member. If the pad is used as the pressing member, the pad supports the lower surface of the inner column while slidably contacting when the outer column and the inner column are relatively displaced in the axial direction so that the rear end section of the outer column is prevented from tilting downward.

In another embodiment, the steering device includes the steering shaft, the steering column, the support bracket, and the adjusting rod. The steering shaft is configured by fitting the rear section of the inner shaft disposed on the front side of the steering column to the front section of the outer shaft disposed on the rear side of the steering column to enable torque transmission and to be displaceable with respect to the front section of the outer shaft in the axial direction. The steering column rotatably supports the steering shaft therein by using, for example, a plurality of rolling bearings. Since the support bracket is supported on the vehicle body, the pair of support plates configured to sandwich the front end section of the outer column constituting the steering column from both sides thereof in the width direction is provided. The adjusting rod is inserted through the telescopic adjustment slot, which is formed in the front end section of the outer column in the axial direction of the outer column, and the through holes, which are formed in the support plates (when the tilt mechanism is provided, the through holes are set to be the tilt adjustment slots which are vertically long, and when the tilt mechanism is not provided, the through holes are set to be simple circular holes). In the embodiment, the telescopic steering column is used as the steering column.

According to the above-described embodiments, an operational feeling of adjusting a front and the rear position of a steering wheel can be improved, and an operational load can be suppressed to be small. That is to say, the pressing member in which the lower surface of the inner column is in contact with the lower portion of the front section of the inner column and the outer column which constitutes the steering column and is provided on the rear side of the steering column so that the rear end section of the outer column is prevented from tilting downward on the basis of the gap between the inner circumferential surface of the outer column and the outer circumferential surface of the inner column is provided.

For this reason, even when the interval between the inner surfaces of the pair of support plates constituting the support bracket is widened, direct contact of the lower end section of the front edge of the outer column and the outer circumferential surface of the inner column can be prevented and contact of the upper end section of the rear edge of the inner column and the inner circumferential surface of the outer column can be prevented. Therefore, when the front and rear position of the steering wheel is adjusted, occurrence of catching (twisting) can be effectively prevented. As a result, according to the present invention, when the front and rear position of the steering wheel is adjusted, the occurrence of catching (twisting) can be prevented, an operational feeling of adjusting the front and rear position can be improved, and an operational load can be suppressed to be small.

EXPLANATION OF NUMERALS AND CHARACTERS

1 Steering wheel
2, 2a Steering shaft
3 Steering wheel
4, 4a Steering column
5 Steering force auxiliary device
6 Tie rod
7 Steering gear unit
8 Inner shaft
9, 9a Outer shaft
10, 10a Inner column
11, 11a Outer column
12, 12a Gear housing
13 Output shaft
14, 14a Lower bracket
15, 15a Vehicle body
16, 16a Tilt shaft
17, 17a Upper bracket (support bracket)
18, 18a Locking capsule
19 Slit
20 Clamp part
21, 21a Slot (telescopic adjustment slot)
22, 22a Support plate
23, 23a Slot (tilt adjustment slot)
24, 24a Adjusting rod
25 Adjusting nut
26, 26a Adjusting lever
27, 27a Anchor part
28 Universal joint
29 Intermediate shaft
30 Universal joint
31 Shaft (input shaft)
32, 32a Electric motor
33 Locking through hole
34 Frame body (sandwiched portion main body, main body)
35 Cylindrical body (cylindrical part)
36 Axial slit (first slit)
37a, 37b Circumferential slit (second slit)
38 Clamp part
39 Projecting plate (projecting part)
40 Acting surface (third surface, pressing surface)
41 Reinforcing bridge part (reinforcing part)
42 Reinforcing plate
43a, 43b Joining part
44 Flat plate
45 Downward extending part
46 Cutout
47 Gap
49a Acting surface (first surface, torque transmission surface)
49b Acting surface (second surface, torque transmission surface)
50a, 50b Ridge part
51 Reinforcing rib
52 Reinforcing connection plate
53 Depressed part
54 Attachment part
55 Screw hole
56, 56a Shoulder bolt
57 Head
58, 58a Shaft part
59 Hexagon hole
60, 60a Large diameter section
61, 61a Small diameter section
62 Male threaded section
63 Female threaded section
64 Rolling bearing
65 Outer ring
66 Inner ring
67 Rolling element
68 Spacer
69, 69a Collar
70, 70a roller
71 Attachment plate
72 Locking cutout
73 Cam device
74 Nut
75 Fixed part
76 Attachment flange
77 Cylindrical member
78 Outward flange
79 Bolt
80 Head
81 Shaft part
82 Pad
83 Pressed surface
84 Through hole
101 Tightening mechanism
105 Support mechanism (posture holding mechanism)

The invention claimed is:

1. A steering device comprising:
a steering shaft in which a rear section of an inner shaft disposed on a front side of the steering shaft and a front section of an outer shaft disposed on a rear side of the steering shaft are displaceably set with each other in an axial direction such that torque can be transmitted;
a steering column having an inner column and an outer column and in which the steering shaft is rotatably supported, the steering column being arranged such that a rear end section of the inner column is enclosed by a front end section of the outer column such that the inner column and the outer column are displaceably set with each other in an axial direction of the outer column;

a support bracket including a pair of support plates which sandwich the front end section of the outer column from both sides thereof in a width direction, the support bracket being installable on a vehicle body;

an adjusting rod inserted through a telescope adjustment slot, which is formed in the front end section of the outer column in the axial direction of the outer column, and through holes, which are formed in the support plates; and, a pressing member provided on a lower portion of the front section of the outer column so as to be in contact with a lower surface of the inner column to prevent the rear end section of the outer column from tilting downward on the basis of a gap between an inner circumferential surface of the outer column and an outer circumferential surface of the inner column, wherein the pressing member is disposed near the front end section of the outer column and is located at a forward position relative to the adjusting rod.

2. The steering device according to claim 1, wherein, when the inner column and the outer column are relatively displaced in the axial direction, the pressing member comes into rolling or surface contact with the lower surface of the inner column.

3. The steering device according to claim 1, wherein all or a part of the pressing member is made of an elastic material.

4. The steering device according to claim 1, wherein the pressing member is supported on the outer column by a support member disposed in a width direction of the outer column and fixed to the outer column in a cantilevered manner.

5. The steering device according to claim 4, wherein the support member is a shoulder bolt.

6. The steering device according to claim 4, wherein the pressing member is a roller rotatably supported around the support member.

7. The steering device according to claim 6, wherein any one of an outer circumferential surface and an inner circumferential surface of the roller is made of an elastic material.

8. The steering device according to claim 1, wherein the pressing member is a pad, and a surface thereof is in contact with the lower surface of the inner column is set as a concave cylinder surface.

9. A steering device comprising:

an outer column having a cylindrical body;

an inner column arranged such that a rear end section of the inner column is enclosed by a front end section of the cylindrical body, and such that a relative axial position of the outer column with respect to the inner column is adjustable;

a support bracket installable on a vehicle body and including a pair of support plates, the support plates being provided so as to sandwich the front end section of the outer column from both sides thereof in a width direction, an adjusting rod inserted through a slot and holes, the slot being provided on the front end section of the outer column and extending in an axial direction of the outer column, the holes being provided on the support plates respectively; and a mechanism provided in the outer column, having a roller disposed near the front end section of the cylindrical body, and arranged to be in contact with a lower surface of the inner column such that a posture of the inner column with respect to the outer column is maintained when the relative axial position of the outer column with respect to the inner column is adjusted, wherein the roller is located at a forward position relative to the adjusting rod.

10. The steering device according to claim 9, wherein the mechanism has an elastic structure in a radial direction of the cylindrical body.

* * * * *